United States Patent
Takakuwa et al.

(10) Patent No.: US 7,555,203 B2
(45) Date of Patent: *Jun. 30, 2009

(54) INFORMATION RECORDING MEDIUM, INFORMATION RECORDING AND/OR REPRODUCING APPARATUS AND METHOD, COMPUTER PROGRAM FOR CONTROLLING RECORD OR REPRODUCTION, AND DATA STRUCTURE INCLUDING CONTROL SIGNAL

(75) Inventors: Nobuyuki Takakuwa, Saitama (JP); Takeshi Koda, Saitama (JP); Tohru Kanegae, Saitama (JP); Masanori Nakahara, Saitama (JP); Takao Sawabe, Saitama (JP); Yasuko Fukuda, Saitama (JP)

(73) Assignee: Pioneer Corporation, Tokyo (JP)

( * ) Notice: Subject to any disclaimer, the term of this patent is extended or adjusted under 35 U.S.C. 154(b) by 694 days.

This patent is subject to a terminal disclaimer.

(21) Appl. No.: 10/504,745

(22) PCT Filed: Feb. 18, 2003

(86) PCT No.: PCT/JP03/01703

§ 371 (c)(1),
(2), (4) Date: Jan. 28, 2005

(87) PCT Pub. No.: WO03/069622

PCT Pub. Date: Aug. 21, 2003

(65) Prior Publication Data

US 2005/0123279 A1 Jun. 9, 2005

(30) Foreign Application Priority Data

Feb. 18, 2002 (JP) ............................. 2002-040774

(51) Int. Cl.
*H04N 5/00* (2006.01)
*H04N 7/00* (2006.01)
*H04N 7/12* (2006.01)
*H04N 7/26* (2006.01)
*G11B 5/09* (2006.01)
*G11B 21/08* (2006.01)

(52) U.S. Cl. ........................... 386/98; 386/95; 386/111; 386/112; 386/125; 386/126; 348/423.1; 348/432.1; 369/30.03; 369/47.2; 369/59.25

(58) Field of Classification Search ................... 386/98, 386/95, 111, 112, 125, 126; 348/432.1, 423.1; 369/30.03, 47.2, 59.25

See application file for complete search history.

(56) References Cited

U.S. PATENT DOCUMENTS 6,950,604 B1 * 9/2005 Kato et al. ..................... 386/98
7,231,134 B2 * 6/2007 Kusaka et al. ................. 386/95

FOREIGN PATENT DOCUMENTS

JP 2000-011608 1/2000

(Continued)

*Primary Examiner*—Thai Tran
*Assistant Examiner*—Syed Y Hasan
(74) *Attorney, Agent, or Firm*—Young & Thompson

(57) ABSTRACT

An entire stream containing a plurality of partial streams each consisting of content information is multiple-recorded on packet basis on an information recording medium. The information recording medium includes a file for storing object data consisting of a plurality of packets each containing a content information piece and further includes a file for storing information defining a reproduction sequence of object data and information indicating discontinuity of continuous numbers caused by absence of a packet during edition of continuous numbers of a plurality of packets corresponding to the recording order during multiple recording.

20 Claims, 27 Drawing Sheets

FOREIGN PATENT DOCUMENTS

| | | |
|---|---|---|
| JP | 2000-312342 | 11/2000 |
| JP | 2001-298715 | 10/2001 |

* cited by examiner

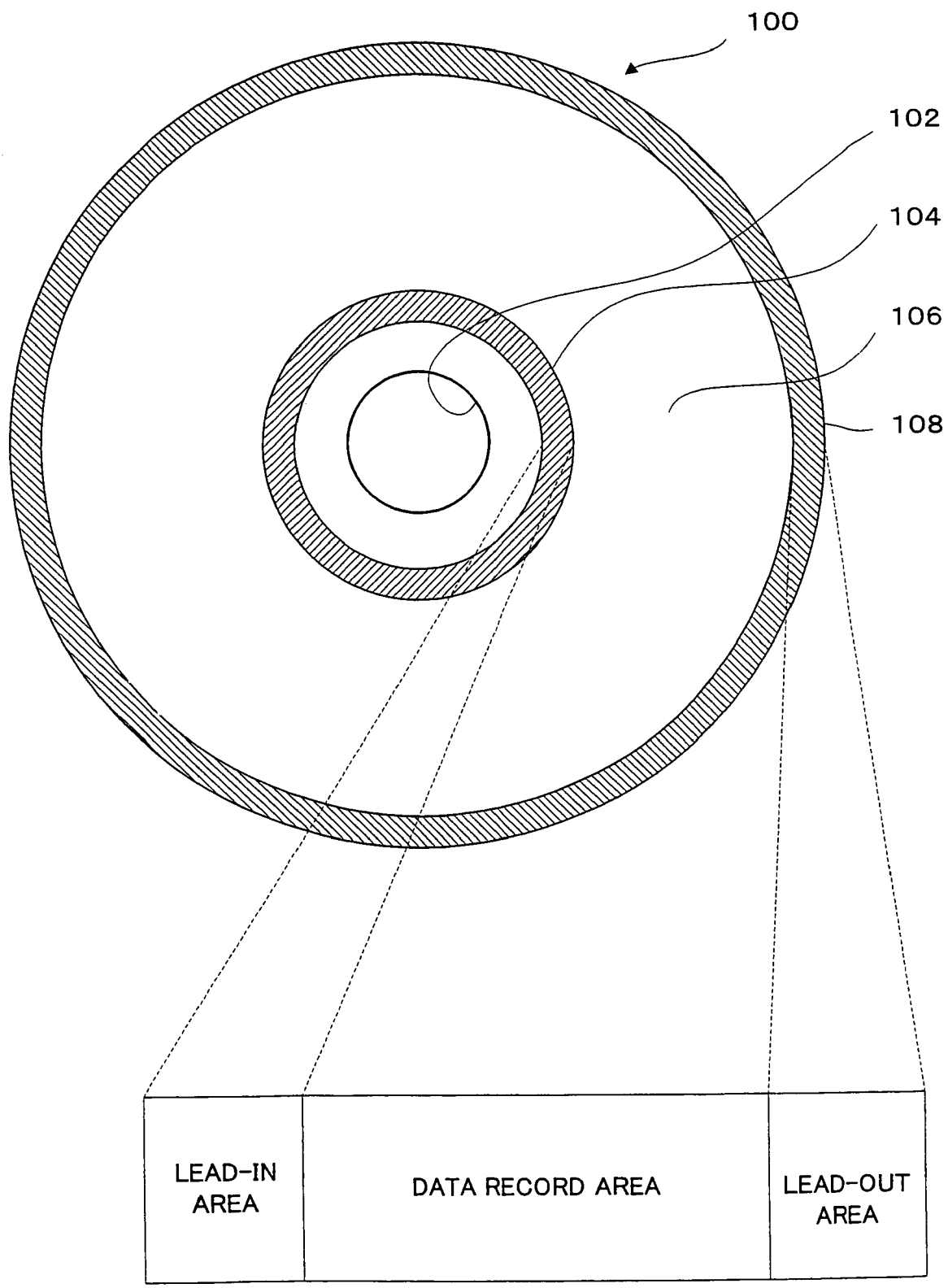

FIG. 10
(a)

ADDRESS
INFORMATION
FOR
ES STREAM
index#1

| DISPLAY START TIME POINT | SPN (PACKET NUMBER) |
|---|---|
| T1_0 | 0 |
| T1_1 | 130 |
| T1_2 | 258 |
| T1_3 | 392 |
| ... | ... |

ADDRESS
INFORMATION
FOR
ES STREAM
index#2

| DISPLAY START TIME POINT | SPN (PACKET NUMBER) |
|---|---|
| T2_0 | 1 |
| T2_1 | 4 |
| T2_2 | 5 |
| T2_3 | 9 |
| ... | ... |

ADDRESS
INFORMATION
FOR
ES STREAM
index#3

| DISPLAY START TIME POINT | SPN (PACKET NUMBER) |
|---|---|
| T3_0 | 2 |
| T3_1 | 7 |
| T3_2 | 10 |
| T3_3 | 11 |
| ... | ... |

DISCONTINUOUS INFORMATION OF SPN (COMMON REGARDLESS OF ESSTREAM)

| DISCONTINUITY START SPN(PACKET NO.) | OFFSET VALUE (NUMBER OF LACKED PACKETS+1) |
|---|---|
| 12 | 5 |
| 86 | 10 |
| ... | ... |
| ... | ... |
| ... | ... |

TS #1 OBJECT

| | Program Map PID | Program No. | Contents of ES | ES_PID |
|---|---|---|---|---|
| SHOW1 | 100 | 1 | Video 1 | 101 |
| | | | Audio 1 | 102 |
| | | | Audio 2 | 103 |
| | 200 | 2 | Video 2 | 201 |
| | | | Audio 3 | 202 |
| SHOW2 | 300 | 3 | Video 3 | 301 |
| | | | Audio 4 | 302 |
| | | | Audio 5 | 303 |

TS #2 OBJECT

| Program Map PID | Program No. | Contents of ES | ES_PID |
|---|---|---|---|
| 200 | 1 | Video 4 | 201 |
| | | Audio 6 | 202 |
| | | Audio 7 | 203 |
| 100 | 2 | Video 5 | 101 |
| | | Audio 8 | 102 |

TIME ELAPSE IN BROADCASTING

FIG. 24

PAT and PMT of TS #1 OBJECT

| PAT (PID=0) |
|---|
| Program 1: (100) |
| Program 2: (200) |
| Program 3: (300) |

| PMT for Program 1 | (PID=100) |
|---|---|
| Video 1: | (101) |
| Audio 1: | (102) |
| Audio 2: | (103) |

| PMT for Program 2 | (200) |
|---|---|
| Video 2: | (201) |
| Audio 3: | (202) |

| PMT for Program 3 | (300) |
|---|---|
| Video 3: | (301) |
| Audio 4: | (302) |
| Audio 5: | (303) |

FIG. 25
PAT and PMT of TS #2 OBJECT
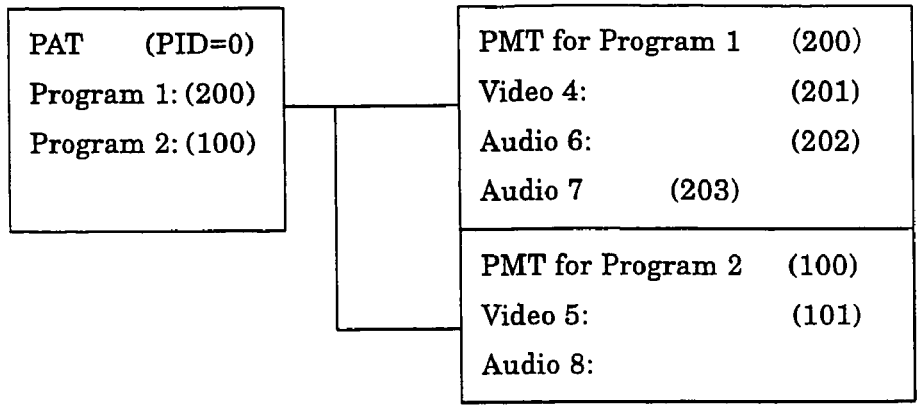
FIG. 26
TS #3 OBJECT
| Program Map PID | Program NO. | Contents of ES | ES_PID |
|---|---|---|---|
| 100 | 1 | Video 6 | 101 |
|  |  | Audio 9 | 102 |
|  |  | Audio 10 | 103 |
|  |  | Sub picture 1 | 104 |
|  |  | Sub picture 2 | 105 |
FIG. 27
PAT and PMT of TS #3 OBJECT
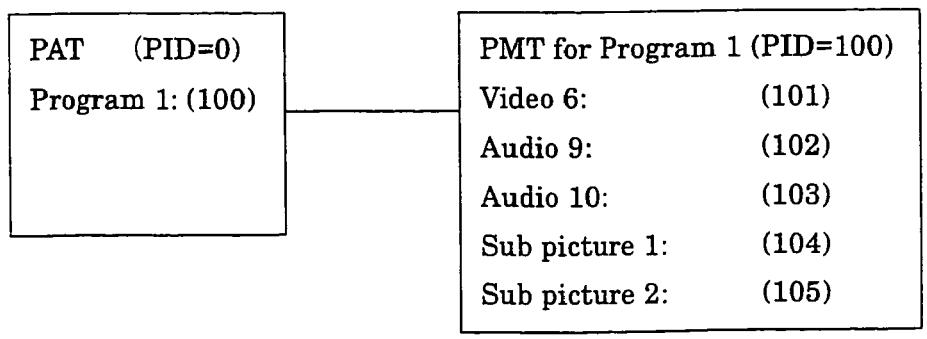

FIG. 28

| DISC | | | | |
|---|---|---|---|---|
| TITLE #1 | | | TITLE #2 | |
| P LIST #1 | | | P LIST #2 | |
| Item #1 | | Item #2 | | Item #1 |
| TS #1 OBJECT | | TS #2 OBJECT | | TS #3 OBJECT |
| Vision #1 | Video 1 | Vision# 1 | Video 4 | Video 6 |
| | Audio 2 | | Audio 7 | Audio 9 |
| Vision #2 | Video 2 | Vision# 2 | Video 5 | Audio 10 |
| | Audio 3 | | Audio 8 | Sub picture 1 |
| | | | | Sub picture 2 |

FIG. 29

| FIELD NAME | | DESCRIPTION CONTENTS |
|---|---|---|
| DISC COMPREHENSIVE INFORMATION | | DISC VOLUME INFORMATION, TOTAL TITLE NUMBER etc. |
| TITLE INFO. table | TITLE POINTER | STORING ADDRESS OF TITLE #1 INFO., OTHER INFO. ABOUT TITLE #1, such as TITLE TYPE |
| | | STORING ADDRESS OF TITLE #2 INFO., OTHER INFO. ABOUT TITLE #1, such as TITLE TYPE |
| | | |
| | TITLE#1 INFO. | THE NUMBER OF THE HEAD OF P LISTS OF TITLE #1, OTHER INFO. ABOUT THIS P LIST |
| | | THE NUMBER OF OTHER P LISTS IN TITLE #1, OTHER INFO. ABOUT THIS P LIST |
| | | |
| | TITLE #2 INFO. | THE NUMBER OF THE HEAD OF P LISTS OF TITLE #2, OTHER INFO. ABOUT THIS P LIST |
| | | |
| OTHER INFORMATION | | |

FIG. 30

TITLE INFORMATION TABLE     114

| FIELD NAME | DESCRIPTION CONTENTS |
|---|---|
| TITLE POINTER | STORING ADDRESS OF TITLE #1 INFO., TITLE TYPE = ONE P LIST TITLE; namely, TOTAL NUMBER OF P LISTS = 1, OTHER INFO. |
|  | STORING ADDRESS OF TITLE #2 INFO., TITLE TYPE = ONE P LIST TITLE; namely, TOTAL NUMBER OF P LISTS = 1, OTHER INFO. |
| TITLE #1 INFO. | THE NUMBER OF THE HEAD OF P LISTS = 1, OTHER INFO. ABOUT THIS LIST, such as CHAPTER INFO. |
| TITLE #2 INFO. | THE NUMBER OF THE HEAD OF P LISTS = 2, OTHER INFO. ABOUT THIS LIST, such as CHAPTER INFO. |

FIG. 31

P LIST INFORMATION TABLE    122   121   124

| FIELD NAME | | | DESCRIPTION CONTENTS |
|---|---|---|---|
| P LIST COMPREHENSIVE INFO. | | | P LIST SIZE, TOTAL P LIST NUMBERS etc. |
| P LIST POINTER TABLE | P LIST #1 POINTER | | P LIST #1 INFO. STORING ADDRESS |
| | P LIST #2 POINTER | | P LIST #2 INFO. STORING ADDRESS |
| P LIST #1 INFO. TABLE | P LIST #1 COMPREHENSIVE INFO. | | TOTAL NUMBER OF Items CONSTITUTING P LIST #1 = 2, OTHER INFO. |
| | P LIST #1 Item INFO. TABLE | Item#1 INFO. | RELEVANT AU NUMBER IN AU TABLE IN OBJECT INFO. FILE, etc. |
| | | Item#2 INFO. | RELEVANT AU NUMBER IN AU TABLE IN OBJECT INFO. FILE, etc. |
| | OTHER INFORMATION | | |
| P LIST #2 INFO. TABLE | P LIST #2 COMPREHENSIVE INFO. | | TOTAL NUMBER OF Items CONSTITUTING P LIST #2 = 2, OTHER INFO. |
| | P LIST #2 Item INFO. TABLE | Item#1 INFO. | RELEVANT AU NUMBER IN AU TABLE IN OBJECT INFO. FILE, etc. |
| | OTHER INFORMATION | | |

AU Table (131)

| FIELD NAME | | | | CONTENTS |
|---|---|---|---|---|
| AU TABLE COMPREHENSIVE INFO. | | | | NUMBER OF AUs, POINTER TO EACH AU, etc. |
| AU Table | AU #1 (132I) | PU #1 | ES_Table Index #1 | INDEX NO. OF ES_map table =1 |
| | | | ES_Table Index #2 | 3 |
| | | PU #2 | ES_Table Index #1 | 4 |
| | | | ES_Table Index #2 | 5 |
| | AU #2 (302I) | PU #1 | ES_Table Index #1 | 9 |
| | | | ES_Table Index #2 | 10 |
| | | PU #2 | ES_Table Index #1 | 12 |
| | | | ES_Table Index #2 | 13 |
| | AU #3 (131C) | PU #1 | ES_Table Index #1 | 14 |
| | | | ES_Table Index #2 | 15 |
| | | | ES_Table Index #3 | 16 |
| | | | ES_Table Index #4 | 17 |
| | | | ES_Table Index #5 | 18 |
| PACKET NUMBER DISCONTINUITY INFORMATION | | | | PACKET NUMBER DISCONTINUITY START POINT, OFFSET VALUE, etc. |
| OTHER INFORMATION | | | | |

ES_Map Table (134) (134a)

| FIELD NAME | | CONTENTS |
|---|---|---|
| ES_Map Table | ES_map table COMPREHENSIVE INFO. | INDEX NO., etc. |
| | Index #1 | ES_PID VALUE =101 |
| | | ADDRESS INFORMATION |
| | Index #2 | ES_PID =102 |
| | | ADDRESS INFORMATION |
| | Index #3 | ES_PID =103 |
| | | ADDRESS INFORMATION |
| | Index #4 | ES_PID =201 |
| | | ADDRESS INFORMATION |
| | Index #5 | ES_PID =202 |
| | | ADDRESS INFORMATION |
| | Index #6 | ES_PID =301 |
| | | ADDRESS INFORMATION |
| | Index #7 | ES_PID =302 |
| | | ADDRESS INFORMATION |
| | Index #8 | ES_PID =303 |
| | | ADDRESS INFORMATION |
| | Index #9 | ES_PID =201 |
| | | ADDRESS INFORMATION |
| | Index #10 | ES_PID =202 |
| | | ADDRESS INFORMATION |
| | Index #11 | ES_PID =203 |
| | | ADDRESS INFORMATION |
| | Index #12 | ES_PID =101 |
| | | ADDRESS INFORMATION |
| | Index #13 | ES_PID =102 |
| | | ADDRESS INFORMATION |
| | Index #14 | ES_PID =101 |
| | | ADDRESS INFORMATION |
| | Index #15 | ES_PID =102 |
| | | ADDRESS INFORMATION |
| | Index #16 | ES_PID =103 |
| | | ADDRESS INFORMATION |
| | Index #17 | ES_PID =104 |
| | | ADDRESS INFORMATION |
| | Index #18 | ES_PID =105 |
| | | ADDRESS INFORMATION |
| OTHER INFORMATION | | |

INFORMATION RECORDING MEDIUM, INFORMATION RECORDING AND/OR REPRODUCING APPARATUS AND METHOD, COMPUTER PROGRAM FOR CONTROLLING RECORD OR REPRODUCTION, AND DATA STRUCTURE INCLUDING CONTROL SIGNAL

TECHNICAL FIELD

The present invention relates to: an information recording medium, such as a high-density optical disc, on which various information can be recorded at high density, such as main picture information or video information, audio information, sub picture information, and reproduction control information; an apparatus for and a method of recording the information onto the information recording medium; an apparatus for and a method of reproducing the information from the information recording medium; an apparatus and a method capable of both recording and reproducing the information and capable of editing contents, such as main pictures or video and audio, a computer program for controlling the record or the reproduction, and a data structure including a control signal for controlling the reproduction.

BACKGROUND ART

DVDs are generalized as optical discs on which various information is recorded, such as content information, e.g. the video information, the audio information, and the sub picture information, and the reproduction control information. According to the DVD standard, the video information (e.g. video data), the audio information (e.g. audio data), and the sub picture information (e.g. sub picture data) are individually packetized with the reproduction control information (e.g. navigation data) and are multiplexed and recorded on a disc in the "program stream" format of the MPEG 2 (Moving Picture Experts Group phase 2) standard, which is a highly efficient encoding technique. In the video information among them, there is only one stream of data compressed according to the MPEG video format (ISO 13818-2) within one program stream. On the other hand, the audio information is recorded in a plurality of methods (namely, linear PCM, AC-3, MPEG audio, and the like). The audio information can exist up to 8 streams within one program stream. The sub picture information is defined with a bit map and is compressed and recorded in a run-length method. The sub picture information can exist up to 32 streams within one program stream. In the case of the DVD, as described above, a plurality of streams of the chooseable or selectable audio information (e.g. streams of a stereo sound, a surrounding sound, an original English sound, a dubbed Japanese sound, and the like) and a plurality of streams of the chooseable or selectable sub picture information (e.g. streams of Japanese subtitle, English subtitle, and the like) are multiplexed and recorded by using the program stream format, for one stream of the video information in one movie or film, for example.

On the other hand, the "transport stream" format of the MPEG 2 standard has been recently standardized, and this is appropriate for data transmission. According to this transport stream format, a plurality of "elementary streams" are transmitted at the same time. For example, a plurality of shows or programs, such as many TV channels of satellite digital broadcasting, are time-division-multiplexed to one satellite wave and are transmitted at the same time. Namely, in the transport stream format, it is possible to time-division-multiplex the elementary streams of a plurality of main pictures or video, each of which has a large data amount, and transmit them at the same time. For example, it is possible to transmit at the same time a plurality of movies recorded on a plurality of DVDs.

DISCLOSURE OF INVENTION

However, in the above described DVD, although the main picture of one stream can be multiplexed and recorded with the audio information, the sub picture information, and the like of a plurality of streams, the video of the plurality of streams cannot be multiplexed and recorded. Namely, the DVD, on which recording is performed on the basis of the program stream format of the MPEG 2, has such a problem that a plurality of shows or programs cannot be essentially multiplexed and recorded thereon, which are transmitted at that same time in the transport stream format of the MPEG 2 as described above.

Moreover, even if there is a disc which has such a high transmission rate and has such a high recording capacity or such a high recording density as to be capable of recording at the same time the plurality of shows or programs transmitted in the transport stream format, it is difficult or almost impossible to appropriately reproduce one show constructed of one desired elementary stream or generally constructed of a group of a plurality of elementary streams, without accurately controlling which elementary stream out of a plurality of elementary streams in a bundle corresponds to which piece out of many multiplexed content information pieces, when reproducing the disc. Thus, in the practical sense, it is supposed to be necessary to record, onto such a disc, the reproduction control information, which is relatively complicated and which has a relatively huge data amount, aside from the content information in order to execute the reproduction control of the content information. In the case of recording the complicated reproduction control information, it is the best that any change is not applied to the initial content information in recording. However, in a practical case, especially in the case of an information recording medium, such as the DVD, capable of recording and reproducing, it often occurs that one portion of the content information is deleted upon editing after the recording. Consequently, with the partial delete of the content information, the lack of a packet which stores therein the content information pieces occurs. The occurrence of such a lack of the packet arises a need to rewrite various reproduction control information, which is written or recorded complicatedly so as to perform highly accurate reproduction control by a unit of packet, at least by a unit of object data file to be reproduced at each time of editing with the lack of the packet. As a result, it is necessary to perform large-scale processing of data analysis, data generation, or writing at each time of editing, thereby increasing a processing time or load at the side of an apparatus and generating a recording area of no use at the side of the disc, which is a technical problem.

It is therefore an object of the present invention to provide an information recording medium, an apparatus for and a method of recording information, an apparatus for and a method of reproducing the information, an apparatus for and a method of recording and reproducing the information, a computer program for controlling the record or the reproduction, and a data structure including a control signal for controlling the reproduction, which make it possible to multiplex and record a large amount of content information, such as a plurality of shows or programs, and relatively simply reproduce a desired one from among them and which enable the content information to be efficiently edited.

The above object of the present invention can be achieved by an information recording medium on which content information constructing a series of contents is multiplexed-and-recorded by a unit of packet, which is a physically accessible unit, provided with: an object data file, which is a logically accessible unit, for storing object data which is provided with a plurality of packets, each storing therein a piece of the content information; a reproduction sequence information file for storing reproduction sequence information which defines a reproduction sequence of the object data stored in the object data file; and an object information file for storing, as reproduction control information for controlling the reproduction of the object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number.

According to the information recording apparatus of the present invention, a plurality of content information constructing a series of contents, such as the video information, the audio information, and the sub picture information, is multiplexed-and-recorded onto the information recording medium by a unit of packet (e.g. a TS packet described later), which is a physically accessible unit by an information reproducing apparatus. Here, the object data file is a logically accessible unit by the information reproducing apparatus and stores the object data which is provided with the plurality of packets, each storing therein a piece of the content information. The reproduction sequence information file stores the reproduction sequence information (e.g. play list information) which defines the reproduction sequence of the object data stored in the object data file.

Then, on the information reproducing apparatus for reproducing the information recording medium, the address of a packet which is an access object is specified by what number packet it is from a packet which is a standard (hereinafter referred to as a "standard packet" as occasion demands), such as a packet recorded at first with the serial number as being "0" or "1" in each object data file, for example. In accordance with the specified address, it is possible to access the packets having an arbitrary serial number in the object data file. For example, such a serial number starts from the serial number of the standard packet "0" in the object data file upon the multiplexing-and-recording, and continues in ascending order according to the recording order. As a result, it is possible to appropriately reproduce the content information multiplexed and recorded with many packets, as a series of contents on the basis of the serial number of the packets. Therefore, it is unnecessary that the information for indicating the serial number of the packets is given to each packet itself.

Incidentally, various information stored in the object information file and the reproduction sequence information file is, different from the case of the object data file, not multiplexed by the unit of packet on the information recording medium. Therefore, it is possible to reproduce the object data on the information reproducing apparatus on the basis of the reproduction control information and the reproduction sequence information.

Here, particularly upon editing with respect to the content information on the information recording medium by an information recording/reproducing apparatus after recording or after reproducing, processing of removing the content information is accompanied in some cases. In such a case, a point at which it is discontinuous after the editing is generated in the serial number given logically so that there is not any point at which it is discontinuous at the beginning of recording. Therefore, the method of accessing an arbitrary packet by specifying the address on the basis of what number packet it is from the standard packet as described above after the editing does no longer function. In order to function such an address specification method again effectively, there arises a need to logically give a new serial number; in other word, there arises a need to record again various information on the recording medium (e.g. the reproduction control information or the like, such as an ES map table, an AU map table, and address information of the packet corresponding to each elementary stream or each elementary stream, as described later) so as to correspond the new serial number. According to the present invention, the object information file stores therein the discontinuity information for indicating a discontinuous condition of a serial number generated by a lack of the packet upon editing. Thus, on the information reproducing apparatus, it is possible to specify the address of the arbitrary packet by referring to the discontinuity information and by calculating what number packet it is from the standard packet, in view of the point at which it is in the discontinuous condition. Thus, it is possible to access the arbitrary packet.

Incidentally, the address of the packet as referred herein may be a physical address, but more generally, it may be a logical address. The actual physical address has a characteristic of being specified uniquely from the logical address by the management of the file system.

As a result, it is unnecessary to update other information related to the serial number on the information recording medium by additionally recording the discontinuity information at each time that the discontinuous condition is generated by the lack of the packet upon editing, so that it is possible to reproduce it appropriately even after the editing. Therefore, even in the case of editing such complicated contents that one show or program is constructed from a plurality of portion streams on the basis of the transport stream of the MPEG 2 or that a plurality of programs are multiplexed and recorded, it is possible to edit them by relatively easy processing.

In addition, with respect to an area which newly becomes recordable by the lack of the packet upon editing (i.e. an area which is released from the management of the file system on the information recording medium thereby to be unrecorded or to be recordable), it is possible to record another content information into the area after the editing. Therefore, it is extremely advantageous even from the viewpoint of saving the recording capacity.

In one aspect of the information recording medium of the present invention, the discontinuity information includes: point information for indicating a point at which the discontinuous condition is generated; and offset information for indicating the number of the packet lacked at the point.

According to this aspect, the discontinuity information includes the point information for indicating a point at which the discontinuous condition is generated, such as a packet number immediately before the discontinuous condition starts and a packet number immediately after the discontinuous condition ends, for example. It further includes the offset information for indicating the number of the packet lacked at such a point that it is discontinuous, i.e. the offset information for indicating a difference between the serial numbers of the packets which are discontinuous. Therefore, on the information reproducing apparatus, it is possible to specify the address of an arbitrary packet by referring to the point indicated by the point information and the packet number indicated by the offset information and by calculating what number packet it is from the standard packet in view of even the point at which it is in the discontinuous condition.

In another aspect of the information recording medium of the present invention, the object data is constructed by multiplexing an entire stream including a plurality of portion streams, each of which is provided with a series of the content information, by the unit of packet, and the object information file stores, as another reproduction control information for controlling the reproduction of the object data file, correspondence definition information which defines a correspondence relationship between the plurality of packets which are multiplexed and the plurality of portion streams.

According to this aspect, the entire stream, such as at least one portion of the transport stream of the MPEG 2, includes the plurality of portion streams, such as the elementary streams. Each of the portion streams is constructed from the content information. Such an entire stream is multiplexed and recorded onto the information recording medium by the unit of packet (e.g. the TS packet described later). Then, the object information file stores the correspondence definition information (e.g. the address information of the packet for each portion stream or the ES map table including these, as described later, or the like) as another reproduction control information. Therefore, it is possible to reproduce the object data on the information reproducing apparatus on the basis of the reproduction control information and the reproduction sequence information as described above.

Incidentally, such an entire stream may include two or more portion streams (i.e. video streams) including the video information as the content information. Alternatively, the entire stream may include the portion stream including the video information as the content information, and a portion stream including the corresponding sub picture information (i.e. a sub picture stream) and a portion stream including the corresponding audio information (i.e. an audio stream).

In this aspect, the correspondence definition information may be constructed have address information, which includes at least one portion of the serial number associated with the packets constructing each portion stream and a display start time point corresponding thereto, for each of the plurality of portion streams.

By constituting in this manner, it is possible to appropriately reproduce a series of portion streams on the basis of the address information of the packet corresponding to each portion stream on the information reproducing apparatus.

In this case, furthermore, if the content information is video information based on a MPEG 2 standard, the address information may be constructed to include the serial number of the packets associated with an i picture and a display start time point corresponding thereto.

By constituting in this manner, upon reproducing, it is possible to specify the address of the packet of interest on the basis of the serial number of the packets associated with the i picture, and it is possible to reproduce the i picture on the basis of the corresponding display start time point. Moreover, on the basis of the i picture, it is possible to reproduce a B picture and a P picture. If there is the audio information corresponding to the video information as described above, the audio information can be reproduced. Namely, it is possible to access the packets associated with the i picture, and moreover, it is possible to access the packets associated with the video information and the audio information related to the accessed i picture. Thus, it is possible to appropriately reproduce a series of contents. Particularly in this case, it is unnecessary to record or write the address information of the packets associated with the B picture and the P picture and the address information of the packet associated with the corresponding audio information, so that it is possible to reduce the amount of the information which is recorded onto the information recording medium as a whole.

In an aspect associated with the entire stream, the portion stream, and the correspondence definition information described above, the correspondence definition information may be constructed to further have table information for indicating a packet identification number which is given uniquely between the plurality of packets multiplexed at the same time point, for each of the portion streams.

By constituting in this manner, it is possible to reproduce the object data on the information reproducing apparatus on the basis of the table information (e.g. an elementary stream packet ID (ES_PID) generated on the basis of a PAT or a PMT in the ES map table described later) for indicating a packet identification number which is given uniquely between the plurality of packets multiplexed at the same time point, for each of the portion streams. Particularly in this case, on the information reproducing apparatus, it is possible to appropriately produce one or a plurality of desired content information from among the plurality of multiplexed and recorded contents, on the basis of the correspondence relationship between the plurality of packets which are multiplexed and the plurality of portion streams, which is described in the table information.

Incidentally, each of the plurality of packets may be constructed to have a packet header for storing therein time information (e.g. ATC information described later) for indicating a reproduction time point on a reproduction time axis of the content information but not storing the information for indicating the serial number. Namely, according to the present invention, even if the information for indicating the serial number is not stored in the packet header of each packet as described above, it is possible to perform such reproduction according to the time information without a problem. On the contrary, according to such a construction, it is possible to prevent the packet header from enlarging.

The above object of the present invention can be achieved by an information recording apparatus for multiplexing and recording content information constructing a series of contents onto an information recording medium by a unit of packet, which is a physically accessible unit, the information recording apparatus provided with: a first recording device for recording an object data file, which is a logically accessible unit, for storing object data which is provided with a plurality of packets, each storing therein a piece of the content information; a second recording device for recording a reproduction sequence information file for storing reproduction sequence information which defines a reproduction sequence of the object data stored in the object data file; and a third recording device for recording an object information file for storing, as reproduction control information for controlling the reproduction of the object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number.

According to the information recording apparatus of the present invention, the object data file for storing the object data is recorded by the first recording device, such as a system controller, an encoder, a TS object generator as described later, and an optical pickup. The reproduction sequence information file for storing the reproduction sequence information is recorded by the second recording device, such as a system controller, an encoder, a TS object generator as described later, and an optical pickup. The object information file for storing the discontinuity information for indicating a discontinuous condition of a serial number generated by a lack of the packet upon editing is recorded by the third recording device, such as a system controller, an encoder, a TS object generator as described later, and an optical pickup, as the reproduction control information. Therefore, it is possible to multiplex and record various content information, such as at least one portion of the transport stream of the MPEG 2, for example, onto the above-described information recording medium of the present invention.

Incidentally, the information recording apparatus of the present invention can also take various aspects in response to various aspects of the above-described information recording medium of the present invention.

The above object of the present invention can be achieved by an information recording method of multiplexing and recording content information constructing a series of contents onto an information recording medium by a unit of packet, which is a physically accessible unit, the information recording method provided with: a first recording process of recording an object data file, which is a logically accessible unit, for storing object data which is provided with a plurality of packets, each storing therein a piece of the content information; a second recording process of recording a reproduction sequence information file for storing reproduction sequence information which defines a reproduction sequence of the object data stored in the object data file; and a third recording process of recording an object information file for storing, as reproduction control information for controlling the reproduction of the object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number.

According to the information recording method of the present invention, the object data file for storing the object data is recorded by the first recording process. The reproduction sequence information file for storing the reproduction sequence information is recorded by the second recording process. The object information file for storing the discontinuity information for indicating a discontinuous condition of a serial number generated by a lack of the packet upon editing is recorded by the third recording process as the reproduction control information. Therefore, it is possible to multiplex and record various content information, such as at least one portion of the transport stream of the MPEG 2, for example, onto the above-described information recording medium of the present invention.

Incidentally, the information recording method of the present invention can also take various aspects in response to various aspects of the above-described information recording medium of the present invention.

The above object of the present invention can be achieved by an information reproducing apparatus for reproducing the recorded content information from the above-described information recording medium (including its various aspects), the information reproducing apparatus provided with: a reading device for physically reading information from the information recording medium; and a reproducing device for reproducing the object data included in the information read by the reading device on the basis of the reproduction control information and the reproduction sequence information included in the information read by the reading device.

According to the information reproducing apparatus of the present invention, information is physically read by the reading device, such as an optical pickup and a demodulator, from the information recording medium by a unit of packet or the like. Then, the object data included in the read information is reproduced by the reproducing device, such as a system controller, a demultiplexer, and a decoder, on the basis of the reproduction control information and the reproduction sequence information included in this read information. Therefore, it is possible to appropriately reproduce, as a series of content information, the content information multiplexed and recorded on the above-described information recording medium of the present invention.

Incidentally, the information reproducing apparatus of the present invention can also take various aspects in response to various aspects of the above-described information recording medium of the present invention.

In one aspect of the information reproducing apparatus of the present invention, upon accessing arbitrary packet, the reproducing device accesses the arbitrary packet by specifying an address of the arbitrary packet on the basis of the discontinuity information.

According to this aspect, the reproducing device specifies the addresses of the plurality of packets in almost real time on the basis of the discontinuity information, upon accessing an arbitrary packet. For example, it is assumed that there is not any packet lacked by the editing between the packet of the access object and the standard packet. In such a condition that the byte number of one packet is B (byte), that the serial number of the standard packet is 0, and that the serial number of the packet of the access object is i, the address of the packet of the access object can be specified to be at a position B×i bytes away from the head of the standard packet. On the other hand, it is assumed that there is any packet or packets lacked by the editing between the standard packet and the packet of the access object. If the number of the lacked packet or packets is j, the address of the packet of the access object can be specified to be at a position B×(i−j) bytes away from the head of the standard packet. Particularly in this case, the discontinuity information, which is about whether or not there is any packet lacked by the editing between the standard packet and the packet of the access object and which is about the number of the lacked packet or packets, is stored in the object information file. Referring to this firstly upon accessing an arbitrary packet makes it possible to access it without a problem.

In another aspect of the information reproducing apparatus of the present invention, the reproducing device specifies an address of an arbitrary packet on the basis of the discontinuity information and maintains it in a memory in advance, and accesses the arbitrary packet on the basis of the address maintained in the memory.

According to this aspect, the reproducing device specifies the addresses of the plurality of packets on the basis of the discontinuity information and maintains them in the memory in advance, before actually accessing the packet. For example, it obtains the discontinuity information at the beginning of reproducing by a unit of the information recording medium or by a unit of the object data file, and it specifies the addresses of the packets as described above. Then, upon actually accessing an arbitrary packet in the object data file, it accesses according to the addresses maintained in the memory. Thus, it is possible to appropriately reproduce the content information.

The above object of the present invention can be achieved by an information reproducing method of reproducing the recorded content information from the above-described information recording medium (including its various aspects), the information reproducing method provided with: a reading process of physically reading information from the information recording medium; and a reproducing process of reproducing the object data included in the information read by the reading process on the basis of the reproduction control information and the reproduction sequence information included in the information read by the reading process.

According to the information reproducing method of the present invention, information is physically read by the reading process from the information recording medium by a unit of packet or the like. Then, the object data included in the read information is reproduced by the reproducing process on the basis of the reproduction control information and the reproduction sequence information included in this read information. Therefore, it is possible to appropriately reproduce, as a series of content information, the content information multiplexed and recorded on the above-described information recording medium of the present invention.

Incidentally, the information reproducing method of the present invention can also take various aspects in response to various aspects of the above-described information recording medium of the present invention and various aspects of the above-described information reproducing apparatus.

The above object of the present invention can be achieved by an information recording and reproducing apparatus for recording content information onto the above-described information recording medium (including its various aspects) and reproducing the recorded content information, the information recording and reproducing apparatus provided with: a first recording device for recording the object data file; a second recording device for recording the reproduction sequence information file; a third recording device for recording the object information file; a reading device for physically reading information from the information recording medium; and a reproducing device for reproducing the object data included in the information read by the reading device on the basis of the reproduction control information and the reproduction sequence information included in the information read by the reading device.

According to the information recording and reproducing apparatus of the present invention, as with the above-described information recording apparatus of the present invention, the object data file is multiplexed and recorded by the first recording apparatus. The reproduction sequence information file is recorded by the second recording device. The object information file is recorded by the third recording device. Then, as with the above-described information reproducing apparatus of the present invention, information is physically read by the reading device from the information recording medium. Then, the object data included in the read information is reproduced by the reproducing device on the basis of the reproduction control information and the reproduction sequence information included in this read information. Therefore, it is possible to multiplex and record various content information, such as at least one portion of the transport stream of the MPEG 2, onto the above-described information recording medium of the present invention, and further it is possible to appropriately reproduce the multiplexed and recorded content information.

Incidentally, the information recording and reproducing apparatus of the present invention can also take various aspects in response to various aspects of the above-described information recording medium of the present invention.

In one aspect of the information recording and reproducing apparatus of the present invention, upon accessing arbitrary packet, the reproducing device accesses the arbitrary packet by specifying an address of the arbitrary packet on the basis of the discontinuity information.

According to this aspect, the reproducing device specifies the addresses of the plurality of packets in almost real time on the basis of the discontinuity information, upon accessing an arbitrary packet. Particularly in this case, the discontinuity information, which is about whether or not there is any packet lacked by the editing between the standard packet and the packet of the access object and which is about the number of the lacked packet or packets, is stored in the object information file. Referring to this firstly upon accessing an arbitrary packet makes it possible to access it without a problem.

In another aspect of the information recording and reproducing apparatus of the present invention, the reproducing device specifies an address of an arbitrary packet on the basis of the discontinuity information and maintains it in a memory in advance, and accesses the arbitrary packet on the basis of the address maintained in the memory.

According to this aspect, the reproducing device specifies the addresses of the plurality of packets on the basis of the discontinuity information and maintains them in the memory in advance, before actually accessing the packet. Then, upon actually accessing the arbitrary packet in the object data file, it accesses according to the addresses maintained in the memory. Thus, it is possible to appropriately reproduce the content information.

In another aspect of the information recording and reproducing apparatus of the present invention, it further provided with: an editing device for controlling the third recording device to additionally record the discontinuity information if the lack of the packet is generated upon editing.

According to this aspect, if the lack of the packet is generated upon editing, what is needed is to additionally record the discontinuity information by the third recording device under the control of the editing device, and it is unnecessary to update other various information related to the serial number (e.g. the reproduction control information or the like, such as the ES map table, the AU map table, and the address information of the packet corresponding to each elementary stream or each elementary stream, as described later), which is advantageous.

The above object of the present invention can be achieved by an information recording and reproducing method of recording content information onto the above-described information recording medium (including its various aspects) and reproducing the recorded content information, the information recording and reproducing method provided with: a first recording process of recording the object data file; a second recording process of recording the reproduction sequence information file; a third recording process of recording the object information file; a reading process of physically reading information from the information recording medium; and a reproducing process of reproducing the object data included in the information read by the reading process on the basis of the reproduction control information and the reproduction sequence information included in the information read by the reading process.

According to the information recording and reproducing method of the present invention, as with the above-described information recording method of the present invention, the object data file is multiplexed and recorded by the first recording process. The reproduction sequence information file is recorded by the second recording process. The object information file is recorded by the third recording process. Then, as with the above-described information reproducing method of the present invention, information is physically read by the reading process from the information recording medium. Then, the object data included in the read information is reproduced by the reproducing process on the basis of the reproduction control information and the reproduction sequence information included in this read information. Therefore, it is possible to multiplex and record various content information, such as at least one portion of the transport stream of the MPEG 2, onto the above-described information recording medium of the present invention, and further it is possible to appropriately reproduce the multiplexed and recorded content information.

Incidentally, the information recording and reproducing method of the present invention can also take various aspects in response to various aspects of the above-described information recording medium of the present invention and various aspects of the above-described information recording and reproducing apparatus of the present invention.

The above object of the present invention can be achieved by a computer program for controlling record which controls a computer provided in the above-described information recording apparatus of the present invention (including its various aspects) and which causes the computer to function as at least one portion of the first recording device, the second recording device, and the third recording device.

According to the computer program for controlling record of the present invention, the above described information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be achieved by a computer program for controlling reproduction which controls a computer provided in the above-described information reproducing apparatus of the present invention (including its various aspects) and which causes the computer to function as at least one portion of the reproducing device.

According to the computer program for controlling reproduction of the present invention, the above described information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be achieved by a computer program for controlling record and reproduction which controls a computer provided in the above-described information recording and reproducing apparatus of the present invention (including its various aspects) and which causes the computer to function as at least one portion of the first recording device, the second recording device, the third recording device, and the reproducing device.

According to the computer program for controlling record and reproduction of the present invention, the above described information recording and reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be achieved by a data structure including a control signal, in which content information constructing a series of contents is multiplexed-and-recorded by a unit of packet, which is a physically accessible unit, having: an object data file, which is a logically accessible unit, for storing object data which comprises a plurality of packets, each storing therein a piece of the content information; a reproduction sequence information file for storing reproduction sequence information which defines a reproduction sequence of the object data stored in the object data file; and an object information file for storing, as reproduction control information for controlling the reproduction of the object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number.

According to the data structure including a control signal of the present invention, even in the case of editing such complicated contents that one show or program is constructed from a plurality of portion streams on the basis of the transport stream of the MPEG 2 or that a plurality of programs are multiplexed and recorded, it is possible to edit them by relatively easy processing. In addition, with respect to an area which newly becomes recordable by the lack of the packet upon editing, it is possible to record another content information into the area after the editing. Therefore, it is extremely advantageous even from the viewpoint of saving the recording capacity.

The above object of the present invention can be also achieved by a first program storage device readable by a computer in an information recording apparatus for tangibly embodying a program of instructions executable by the computer to perform the above-described information recording method of the present invention.

The above object of the present invention can be also achieved by a second program storage device readable by a computer in an information reproducing apparatus for tangibly embodying a program of instructions executable by the computer to perform the above-described information reproducing method of the present invention.

The above object of the present invention can be also achieved by a third program storage device readable by a computer in an information recording and reproducing apparatus for tangibly embodying a program of instructions executable by the computer to perform the above-described information recording and reproducing method of the present invention.

According to the first, second, or third program storage device, such as a CD-ROM, a ROM, a DVD-ROM, and a hard disk, of the present invention, the above described information recording method, information reproducing method, or information recording and reproducing method of the present invention can be relatively easily realized as a computer reads and executes the program of instructions or as it executes the program after downloading the program through a communication device.

The above object of the present invention can be also achieved by a first computer data signal embodied in a carrier wave and representing a series of instructions which cause a computer in an information recording apparatus to perform the above-described information recording method of the present invention.

The above object of the present invention can be also achieved by a second computer data signal embodied in a carrier wave and representing a series of instructions which cause a computer in an information reproducing apparatus to perform the above-described information reproducing method of the present invention.

The above object of the present invention can be also achieved by a third computer data signal embodied in a carrier wave and representing a series of instructions which cause a computer in an information recording and reproducing apparatus to perform the above-described information recording and reproducing method of the present invention.

According to the first, second, or third computer data signal embodied in the carrier wave of the present invention, as the computer downloads the program in the computer data signal through a computer network or the like, and executes this program, it is possible to relatively easily realize the above described information recording method, information reproducing method, or information recording and reproducing method of the present invention.

These functions and other advantages of the present invention will be apparent from the following description of embodiments.

BRIEF DESCRIPTION OF DRAWINGS

FIG. 1 is a diagram showing a basic structure of an optical disc as being one embodiment of an information recording medium of the present invention, the upper part being a schematic plan view of the optical disc having a plurality of areas, the corresponding bottom part being an schematic diagram of the area structure in the radial direction;

FIG. 10 are schematic diagrams, each showing the data structure of ES address information in the embodiment for the relative one of the three elementary streams illustrated in FIG. 9;

FIG. 12 is a schematic diagram of the data structure of discontinuity information in the embodiment;

FIG. 23 is a schematic diagram showing the data structures of TS objects #1 and #2 including a plurality of transport streams in one specific example of the embodiment;

FIG. 24 is a schematic diagram showing the data structures of a PAT and a PMT of the TS object #1 in one specific example of the embodiment;

FIG. 25 is a schematic diagram showing the data structures of a PAT and a PMT of the TS object #2 in one specific example of the embodiment;

FIG. 26 is a schematic diagram showing the data structure of the TS object #3 in one specific example of the embodiment;

FIG. 27 is a schematic diagram showing the data structures of a PAT and a PMT of the TS object #3 in one specific example of the embodiment;

FIG. 28 is a schematic diagram showing the data structure finally constructed on the optical disc in one specific example of the embodiment;

FIG. 29 is a schematic diagram showing one specific example of the data structure of a disc information file in one specific example of the embodiment;

FIG. 30 is a schematic diagram showing one specific example of the data structure of a title information table included in the disc information file in one specific example of the embodiment;

FIG. 31 is a schematic diagram showing one specific example of the data structure of a play list information table constructed in a play list information file in one specific example of the embodiment; and FIG. 32 is a schematic diagram showing one specific example of the data structures of an AU table constructed in an object information file and an ES map table related to the AU table in one specific example of the embodiment.

BEST MODE FOR CARRYING OUT THE INVENTION

Figure 2A:
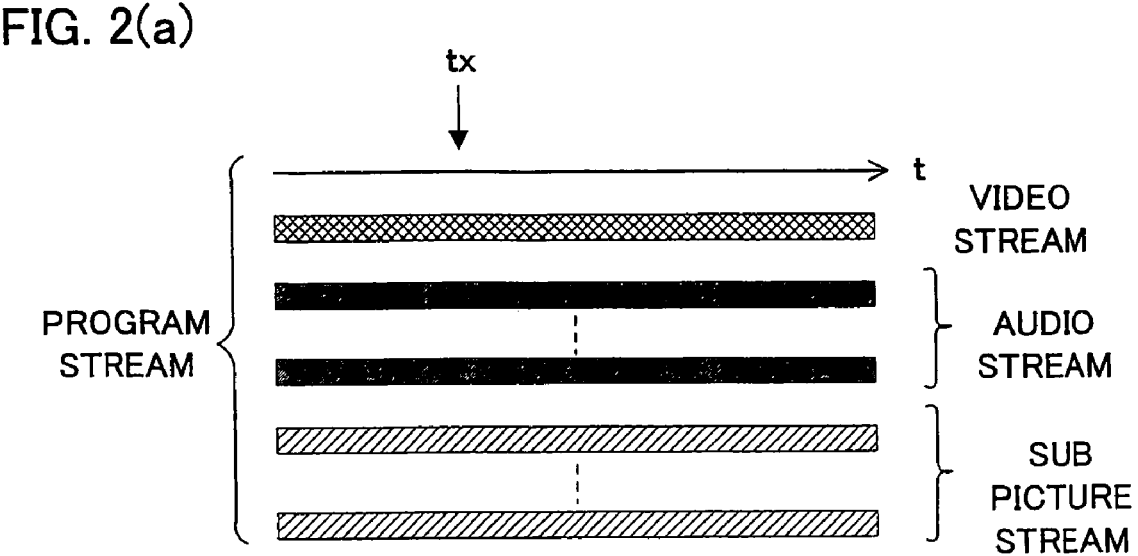
FIG. 2 are a schematic diagram of the conventional program stream of the MPEG 2 (FIG. 2(a)) and a schematic diagram of the transport stream of the MPEG 2 used in the embodiment (FIG. 2(b))

The best mode for carrying out the present invention will be hereinafter explained in order, for each embodiment with reference to the drawings.

(Information Recording Medium)

The embodiment of an information recording medium of the present invention will be explained with reference to FIG. 1 to FIG. 8. In this embodiment, the information recording medium of the present invention is applied to an optical disc of a type capable of recording (writing) and reproducing (reading).

Firstly, the basic structure of the optical disc in the embodiment will be explained with reference to FIG. 1. The upper part of FIG. 1 is a schematic plan view of the optical disc structure having a plurality of areas, and the bottom part is a schematic diagram of the area structure in its radial direction.

As shown in FIG. 1, an optical disc 100 is recordable in various recoding methods, such as a magnet-optical method and a phase transition method, onto which it is possible to record (write) information a plurality of times or only once. It is provided with a lead-in area 104, a data record area 106, and a lead-out area 108 on a recording surface on the disc main body, which is about 12 cm in diameter, as is the DVD, with a center hole 102 as the center, in the direction from the inner circumference to the outer circumference. In each area, groove tracks and land tracks are alternately placed spirally or coaxially with the center hole 102 as the center, for example. These groove tracks may be wobbled, and pre-pits may be formed on either or both of the tracks. Incidentally, the present invention is not specially limited to an optical disc having these three areas.

Figure 2B:
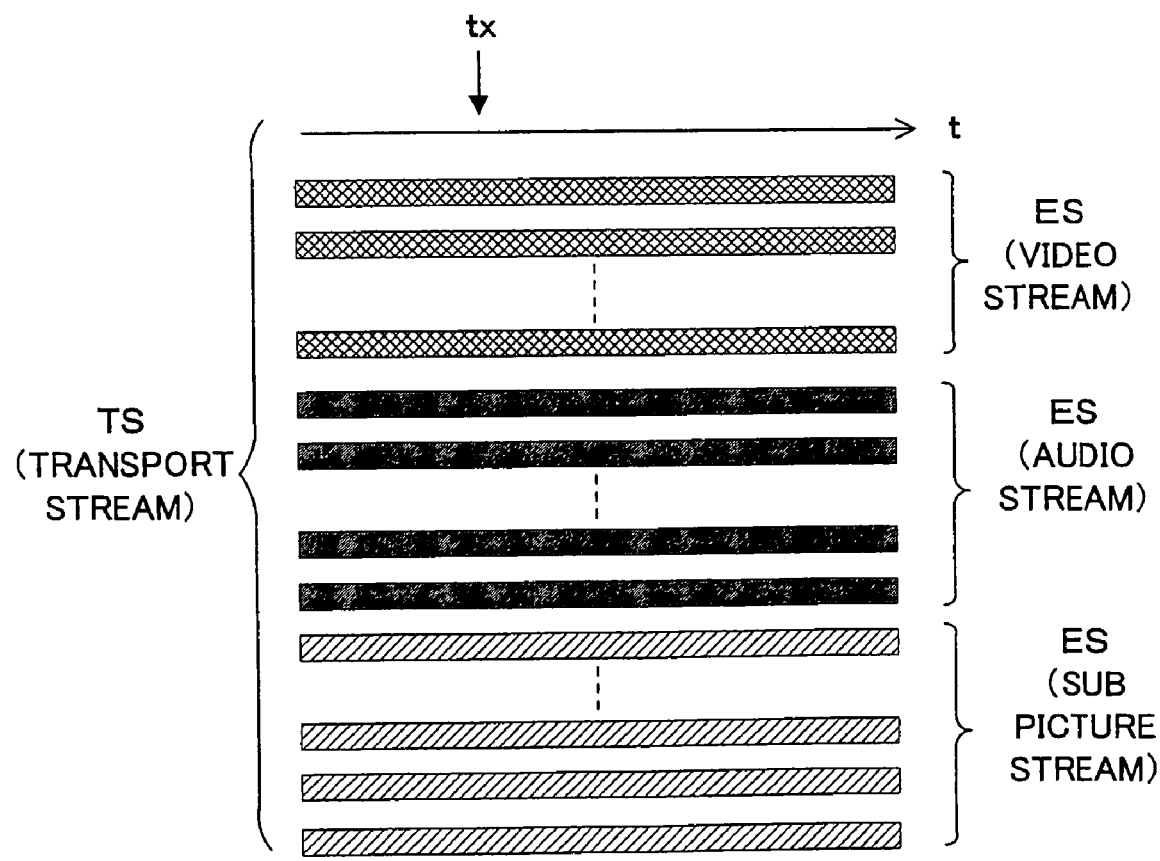

Secondly, the structure of a transport stream (TS) recorded on the optical disc of the present invention will be explained with reference to FIG. 2. FIG. 2(a) schematically shows the structure of a conventional program stream of the MPEG 2 in the conventional DVD, as a comparison. FIG. 2(b) schematically shows the structure of the transport stream (TS) of the MPEG 2.

In FIG. 2(a), one program stream includes (i) only one video stream for video data as being the video information, and further (ii) at most 8 audio streams for audio data as being the audio information, and also (iii) at most 32 sub picture streams for sub picture data as being the sub picture information, along a time axis t. Namely, the video data multiplexed at an arbitrary time point tx is related to only the one video stream. For example, a plurality of video streams corresponding to a plurality of TV shows or movies cannot be included in the program stream at the same time. In order to multiplex the TV show and the like accompanying pictures and transmit or record them, at least one video stream is required for each TV show and the like, so that the program stream format in which only one video stream exists cannot allow the plurality of TV shows and the like to be transmitted or recorded after multiplexing them.

In FIG. 2(b), one transport stream (TS) includes (i) a plurality of video streams, as an elementary stream (ES) for the video data as being the video information, and further (ii) a plurality of audio streams, as an elementary stream (ES) for the audio data as being the audio information, and also (iii) a plurality of sub picture streams, as an elementary stream (ES) for the sub picture data as being the sub picture information. Namely, the video data multiplexed at an arbitrary time point tx is related to the plurality of video streams. For example, the plurality of video streams corresponding to a plurality of TV shows or movies can be included in the transport stream at the same time. As described above, the transport stream format whose transmission rate is high and in which there are the plurality of video streams can allow the plurality of TV shows and the like to be transmitted or recorded after multiplexing them. However, digital broadcasting that employs an existing transport stream does not transmit the sub picture stream.

Incidentally, in FIG. 2(a) and FIG. 2(b), the video stream, the audio stream, and the sub picture stream are arranged in this order from up to down for explanatory convenience; however, this order is not intended to correspond to an order of multiplexing them by a unit of packet, as described later, or the like. In the transport stream, one combination, which is one video stream, two audio streams, and two sub picture streams, conceptually corresponds to one show, for example.

The optical disc 100 in the embodiment described above is constructed to multiplex-and-record onto it the transport stream (TS) including a plurality of elementary streams (ES) in the above manner, to simultaneously record onto it the plurality of shows or programs.

Figure 3:
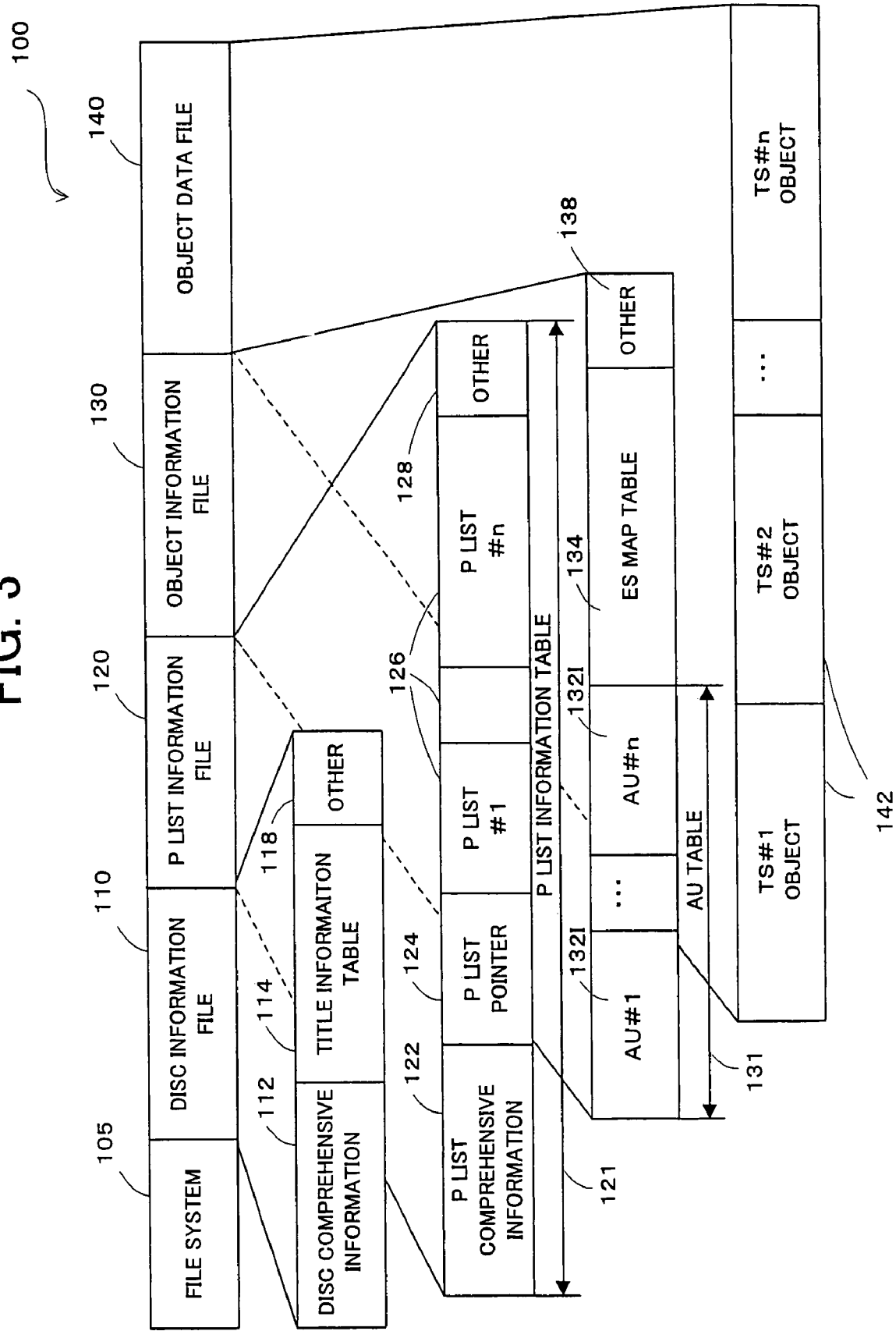
FIG. 3 is a schematic diagram showing a data structure recorded on the optical disc in the embodiment.
Figure 4:
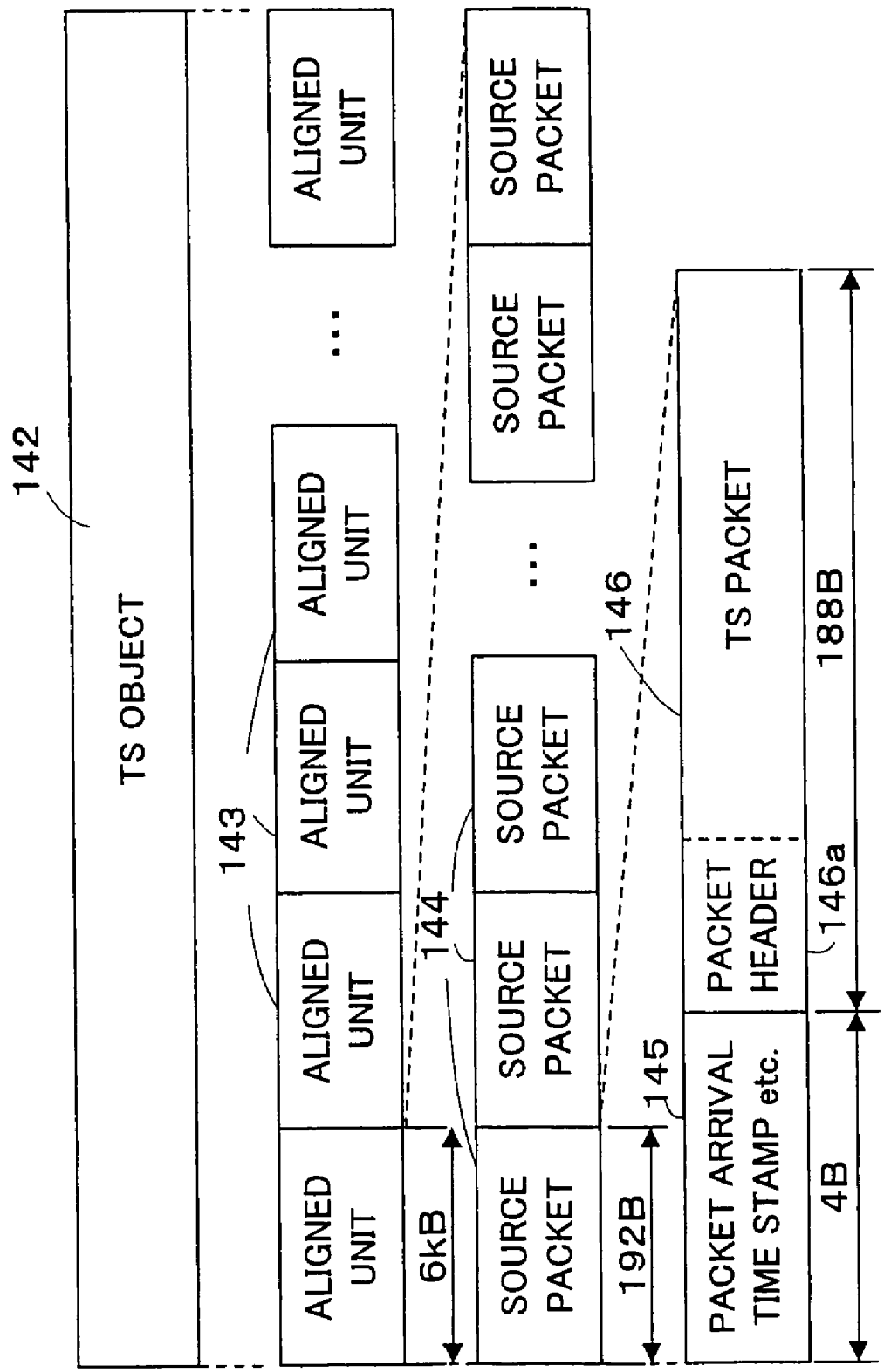
FIG. 4 is a schematic diagram showing details of the data structure in each object shown in FIG. 3.

Next, a data structure recorded on the optical disc 100 will be explained with reference to FIG. 3 and FIG. 4. FIG. 3 schematically shows the data structure recorded on the optical disc 100. FIG. 4 schematically shows details of the data structure in each object shown in FIG. 3.

In the explanation below, a "title" is a reproduction unit sequentially executing a plurality of "play lists", and is a logically large grouped unit, such as one movie and one TV show. The "play list" is a file for storing information necessary for the reproduction of an "object", and is provided with a plurality of "Items", each of which stores information about the reproduction range of the object to access the object. More specifically, "IN point information" indicating a start address of the object and "OUT point information" indicating an end address of the object are written in each Item. Incidentally, these "IN point information" and "OUT point information" may show the addresses directly, or show the addresses indirectly by showing a time length or a time point on a reproduction time axis. The "object" is the entity information of a content constituting the transport stream of the MPEG 2 described above.

In FIG. 3, the optical disc 100 is provided with the following four files as a logical structure: a disc information file 110, a play (P) list information file 120, an object information file 130, and an object data file 140. It is further provided with a file system 105 to manage those files. Incidentally, FIG. 3 does not directly show the physical data alignment on the optical disc 100, but it is possible to record with the arrangement order shown in FIG. 3 corresponding to the arrangement order shown in FIG. 1. Namely, it is possible to record the file system 105 or the like in the lead-in area 104, and then in the data record area 106, and further it is also possible to record the object data file 140 or the like in the data record area 106. Even if the lead-in area 104 and/or the lead-out area 108 shown in FIG. 1 do no exist, the file structure shown in FIG. 3 can be constructed.

The disc information file 110 is a file for storing comprehensive information about the whole optical disc 100, and it stores disc comprehensive information 112, a title information table 114, and other information 118. The disc comprehensive information 112 stores the total number of titles and the like in the optical disc 100, for example. The title information table 114 stores, for each title, each title type (e.g. a sequential reproduction type, a branch type, and the like, as described later with reference to FIG. 8) and a play (P) list number, which constitutes each title, as logical information.

The play list information file 120 is a reproduction sequence information file. The play list information file 120 stores a play (P) list information table 121, which indicates the logical construction of each play list and which is separated into play (P) list comprehensive information 122, a play (P) list pointer 124, a plurality of play (P) lists 126 (P lists #1 to #n), and other information 128. This play list information table 121 stores the logical information of each play list 126 in the order of the play list number. In other words, the storing order of each play list 126 is the play list number. Moreover, it is also possible to refer to the same play list 126 from a plurality of titles at the above described title information table 114. Namely, even in the case where a title #n and a title #m use the same play list #p, it is possible to construct such that the play list #p in the play list information table 121 is pointed at the title information table 114.

The object information file 130 stores various attribute information about the storing position in the object data file 140 for each Item constituted in each play list 126 (i.e. a logical address that is a reproduction object) and about the reproduction of the Item. Especially, in this embodiment, the object information file 130 stores an AU (Associate Unit) table 131 including a plurality of AU information 132I (AU #1 to AU #n), as described later in detail, an ES (Elementary Stream) map table 134, and other information 138.

The object data file 140 stores a plurality of TS objects 142 (TS #1 object to TS #n object) for each transport streams (TS). Namely, it stores a plurality of entity data of the contents to be actually reproduced.

Incidentally, the four files explained with reference to FIG. 3 may be stored with each of them being separated into a plurality of files, and all of them may be managed or administered by the file system 105. For example, the object data file 140 can be separated into a plurality of data files, such as an object data file #1, an object data file #2, . . . and the like.

As shown in FIG. 4, the TS object 142 shown in FIG. 3, which is a logically reproducible unit, is divided into a plurality of aligned units 143, each of which has 6 kB data amount, for example. The head of the aligned units 143 corresponds to (or is "aligned" with) the head of the TS object 142. Each aligned unit 143 is further segmentized into a plurality of source packets 144, each of which has 192 B data amount. The source packet 144 is a physically reproducible unit, and by using this unit, i.e. by a unit of packet, at least the video data, the audio data, and the sub picture data are multiplexed among the data on the optical disc 100. The other information may be also multiplexed in this manner. Each source packet 144 includes: control information 145, which has 4 B data amount, for controlling the reproduction, such as a packet arrival time stamp indicating a reproduction start time point of the TS (transport stream) packet on a reproduction time axis etc.; and a TS packet 146, which has 188B data amount. The TS packet 146 has a packet header 146a at the head portion thereof. The video data is packetized to be a "video packet", the audio data is packetized to be an "audio packet", the sub picture data is packetized to be a "sub picture packet", or the other data is packetized.

Figure 5:
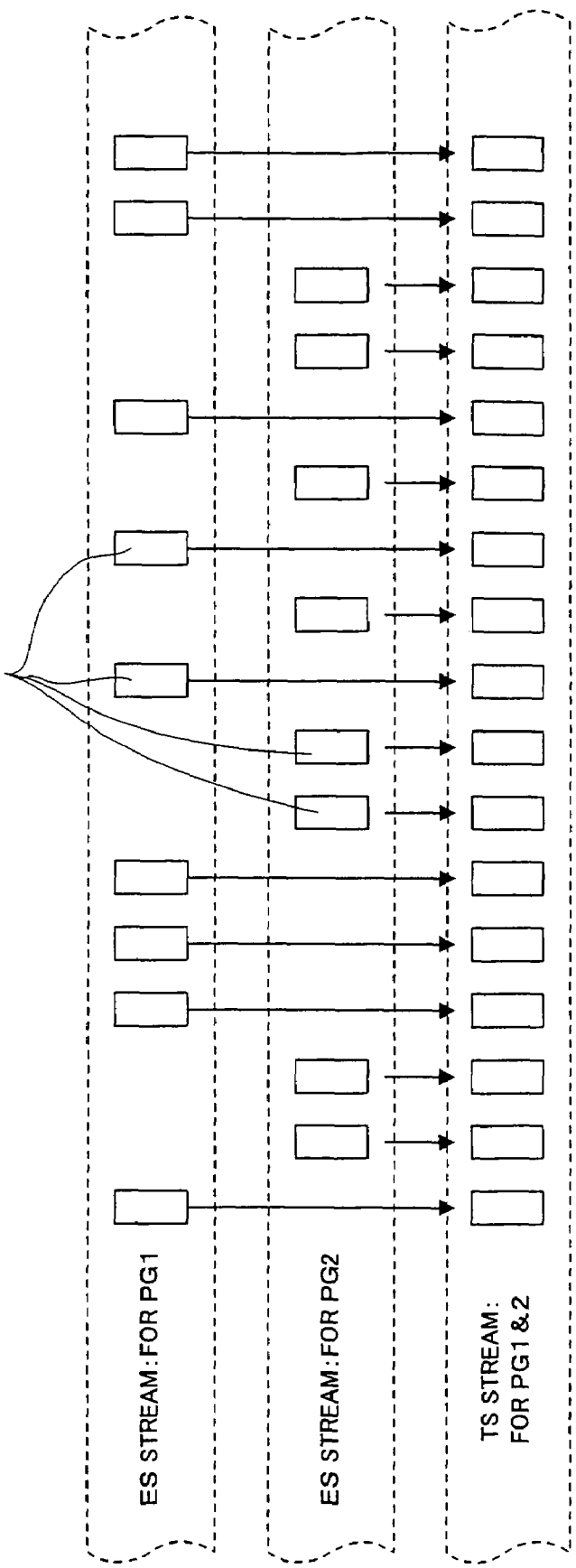
FIG. 5 is a schematic diagram showing that an elementary stream for a program #1 at an upper level and an elementary stream for a program #2 at a middle level are multiplexed, constituting a transport stream for these two programs at a low level, with the horizontal axis as a time axis.
Figure 6:
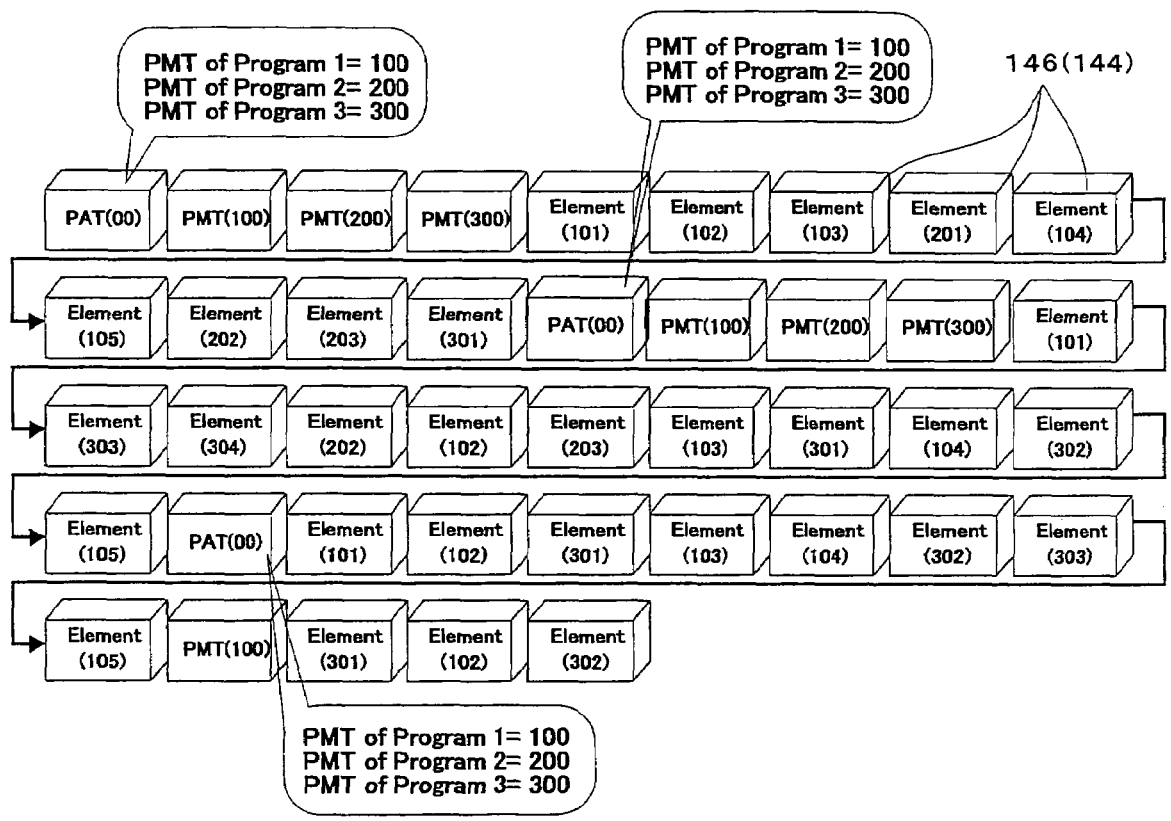
FIG. 6 is a schematic diagram showing the image of TS packets multiplexed in one transport stream as a packet alignment along time.

Next, with reference to FIG. 5 and FIG. 6, it will be explained the multiple record of the video data, the audio data, the sub picture data, and the like, which are in the transport stream format as shown in FIG. 2(b), on the optical disc 100 by the TS packet 146 shown in FIG. 4. FIG. 5 schematically shows that an elementary stream (ES) for a program #1 (PG 1) at the upper level in the figure and an elementary stream (ES) for a program #2 (PG 2) at the middle level in the figure are multiplexed, constituting a transport stream (TS) for these two programs (PG 1 & PG 2) at the lower level in the figure, with the horizontal axis as a time axis. FIG. 6 schematically shows the image of TS packets multiplexed in one transport stream (TS) as a packet alignment along time.

As shown in FIG. 5, the TS packets 146 with the video data for the program #1 packetized are discretely arranged with respect to the time axis in the elementary stream for the program #1 (the upper one), for example. The TS packets 146 with the video data for the program #2 packetized are discretely arranged with respect to the time axis in the elementary stream for the program #2 (the middle one), for example. Then, these TS packets 146 are multiplexed, constructing the transport stream (the lower one) for those two programs. Incidentally, this is omitted in FIG. 5 for explanatory convenience, but in fact, the elementary stream provided with the TS packets in which the audio data is packetized and the sub picture stream provided with the TS packets in which the sub picture data is packetized may be multiplexed as the elementary stream for the program #1 in the same manner as shown in FIG. 2(b). Moreover, in addition to these, the elementary stream provided with the TS packets in which the audio data is packetized and the sub picture stream provided with the TS packets in which the sub picture data is packetized may be multiplexed as the elementary stream for the program #2 in the same manner.

As shown in FIG. 6, in this embodiment, one TS stream is constructed of many TS packets 146 multiplexed as described above. Then, the many TS packets 146 in this multiplexed form obtain the information 145 such as the packet arrival time stamp and are multiplexed-and-recorded on the optical disc 100. Incidentally, "Element (i0j)" is used in FIG. 6 for the TS packet 146 comprising data which constitutes the program #i (i=1, 2, 3), with j (j=1, 2, . . . ) as a number indicating the order for each stream which constitutes the program. This (i0j) is a packet ID, which is the identification number of the TS packet 146 for each elementary stream. A specific value is given to this packet ID between the plurality of TS packets 146 multiplexed at the same time point so that the plurality of TS packets 146 can be mutually distinguished even if they are multiplexed at the same time point.

In FIG. 6, a PAT (Program Associate Table) and a PMT (Program Map Table) are also packetized by a unit of the TS packet 146 and are multiplexed. Among them, the PAT stores a table indicating a plurality of PMT packet IDs. Especially, with regard to the PAT, the MPEG 2 standard defines the addition of (000), as shown in FIG. 6, as a predetermined packet ID. Namely, it is constructed such that the TS packet 146 in which the PAT is packetized is detected as the TS packet 146 with its packet ID (000) from among many packets multiplexed at the same time point. The PMT stores a table indicating the packet ID for each elementary stream constituting each program with respect to one or a plurality of programs. To the PMT, an arbitrary packet ID may be added, but the packet ID of the PMT is indicated by the PAT detectable having the packet ID as (000), as described above. Therefore, the TS packets 146 in each of which the PMT is packetized (i.e. the TS packets 146 with the packet IDs (100), (200), and (300) added in FIG. 6) are detected by virtue of the PAT from among many packets multiplexed at the same time point.

In the case where the transport stream is digital-transmitted as shown in FIG. 6, the tuner can pick up the packets corresponding to the desired elementary stream from among the multiplexed packets by referring to the PAT and the PMT as constructed above, and demodulate them.

In this embodiment, the TS packet 146 stored in the TS object 142 shown in FIG. 4 includes these PAT and PMT packets. Namely, when the transport stream shown in FIG. 6 is transmitted, it can be recorded onto the optical disc 100 as it is, which is a great advantage.

Moreover, in this embodiment, the PAT and PMT as recorded above are not referred to when reproducing the optical disc 100. Instead, referring to the AU table 131 and the ES map table 134, as shown in FIG. 3 and as described later in detail, allows more effective reproduction, and also enables complicate multi-vision reproduction and the like to be treated with. On that account, in this embodiment, the corresponding relationship between the elementary stream and the packet, which are obtained by referring to the PAT and the PMT when demodulating and recording, is stored in the object information file 130 in the form of the AU table 131 and the ES map table 134 without packetizing nor multiplexing.

Figure 7:
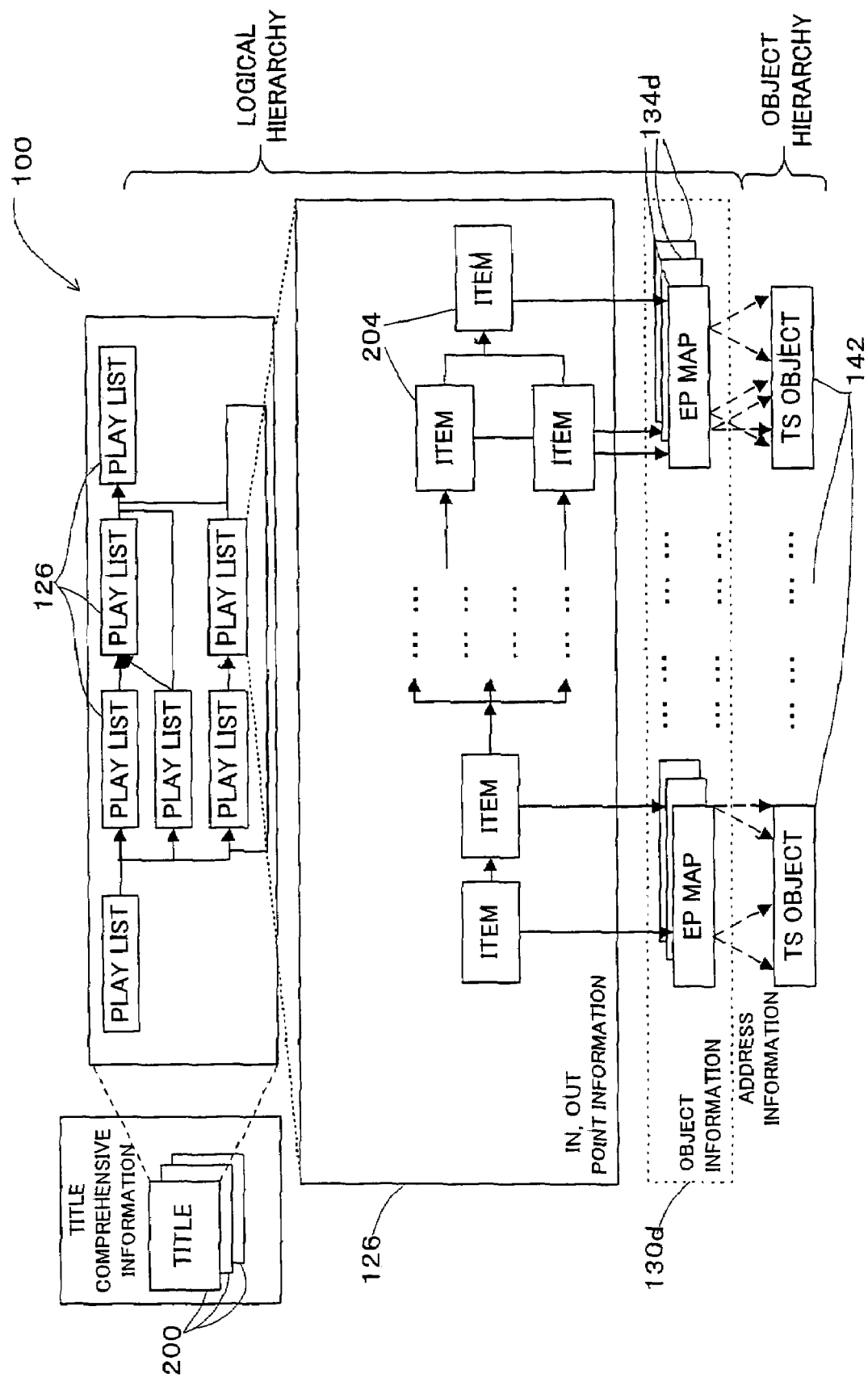
FIG. 7 is a schematic diagram showing the logical construction of data on the optical disc in the embodiment, focusing on the development of a logical hierarchy to an object hierarchy or an entity hierarchy.
Figure 8:
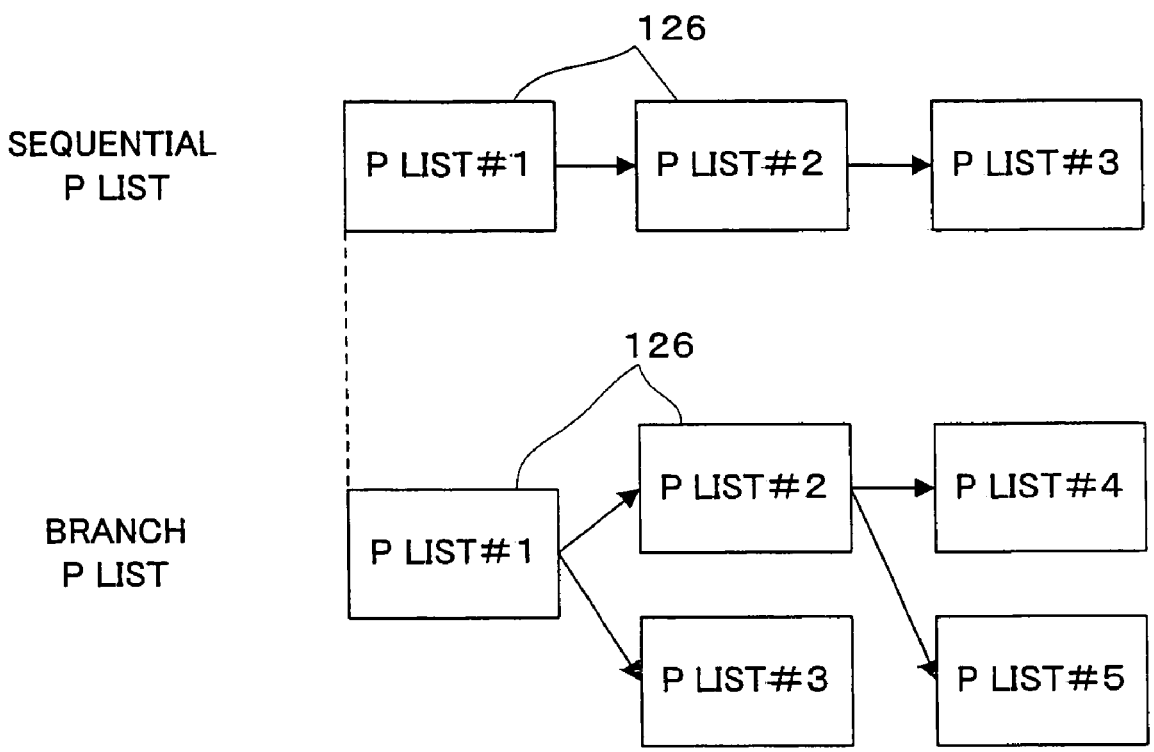
FIG. 8 is a schematic diagram showing two specific examples of the logical construction in a play list constituting one title shown in FIG. 7.

Next, the logical construction of the data on the optical disc 100 will be explained with reference to FIG. 7 and FIG. 8. FIG. 7 schematically shows the logical construction of the data on the optical disc 100, focusing on the development of a logical hierarchy to an object hierarchy or an entity hierarchy. FIG. 8 schematically shows two specific examples of the logical construction in the play (P) list constituting one title shown in FIG. 7.

In FIG. 7, the optical disc 100 records one or a plurality of titles 200, each of which is a logically large unit, such as one movie or one TV show. Each title 200 is logically constructed of one or a plurality of play lists 126. In each title 200, the plurality of play lists 126 may have a sequential structure or a branch structure, which will be described later with reference to FIG. 8. Incidentally, in the case of a simple logical construction, one title 200 is constructed of one play list 126. Moreover, one play list 126 can be referred to from the plurality of titles 200.

Each play list 126 is logically constructed of a plurality of Items (i.e., the play items) 204. In each play list 126, the plurality of Items 204 may have the sequential structure or the branch structure. Moreover, one Item 204 can be referred to from the plurality of play lists 126. The reproduction range of the TS object 142 is logically specified by the above described IN point information and OUT point information written in the Item 204. Then, by referring to object information 130d with respect to the reproduction range logically specified, the reproduction range of the TS object 142 is physically specified via the file system in the end. Here, the object information 130d includes various information to reproduce the TS object 142, such as the attribute information of the TS object 142 and EP (Entry Point) map information 134d required for a data search in the TS object 142 (incidentally, the ES map table 134 shown in FIG. 3 includes a plurality of such EP map information 134d).

When reproducing the TS object 142 by an information recording/reproducing apparatus, which will be described later, a physical address to be reproduced in the TS object 142 is obtained from the Item 204 and the object information 130d, and the desired elementary stream is reproduced.

In this embodiment, as described above, the association from the logical hierarchy to the object hierarchy of the reproduction sequence is made by the IN point information and the OUT point information described in the Item 204 and by the EP map information 134d described in the ES map table 134 (refer to FIG. 3) of the object information 130d, which enables the elementary stream to be reproduced.

Especially in this embodiment, the title 200 is classified broadly into two categories: "one play list type title" and "a plurality of play lists type title", and the latter is further categorized into what is constructed of a "sequential play list" and what is constructed of a "branch play list".

Among them, in the title 200 constructed of "the sequential play list", the play lists #1, #2, and #3 are sequentially reproduced by simply following the reproduction time axis, as shown in the upper part of FIG. 8. In this case, the reproduction order corresponds to the play list number, and therefore, all of the play list numbers are stored in the reproduction order in the pertinent title #n information.

On the other hand, in the title 200 constructed of "the branch play list", as shown in the lower part of FIG. 8, the play list #2 or #3 is selectively reproduced following the play list #1, and further, the play list #4 or #5 is selectively reproduced following the play list #2. In this case, with regard to the reproduction order, the play list 126 to be reproduced next is determined by the branch condition when finishing the reproduction of the play lists 126 in the title. Therefore, the arrangement order of the play lists 126 in the title #n information does not correspond to the reproduction order. Only the play list 126 at the head position is specified. The branch condition is stored in the other areas. Because of this, it is possible to choose either of the play lists 126 by an audience's interactive operation, for example.

Even in the any case of the titles shown in FIG. 8, it is constructed of one or more play lists 126. Especially in this embodiment, it is possible multiplex and record a plurality of elementary streams by a unit of the TS packet 146.

Especially in the embodiment, address information for each elementary stream is written on the ES map table 134 (refer to FIG. 3), and discontinuity information is written on the AU table 131 (refer to FIG. 3).

Figure 9:
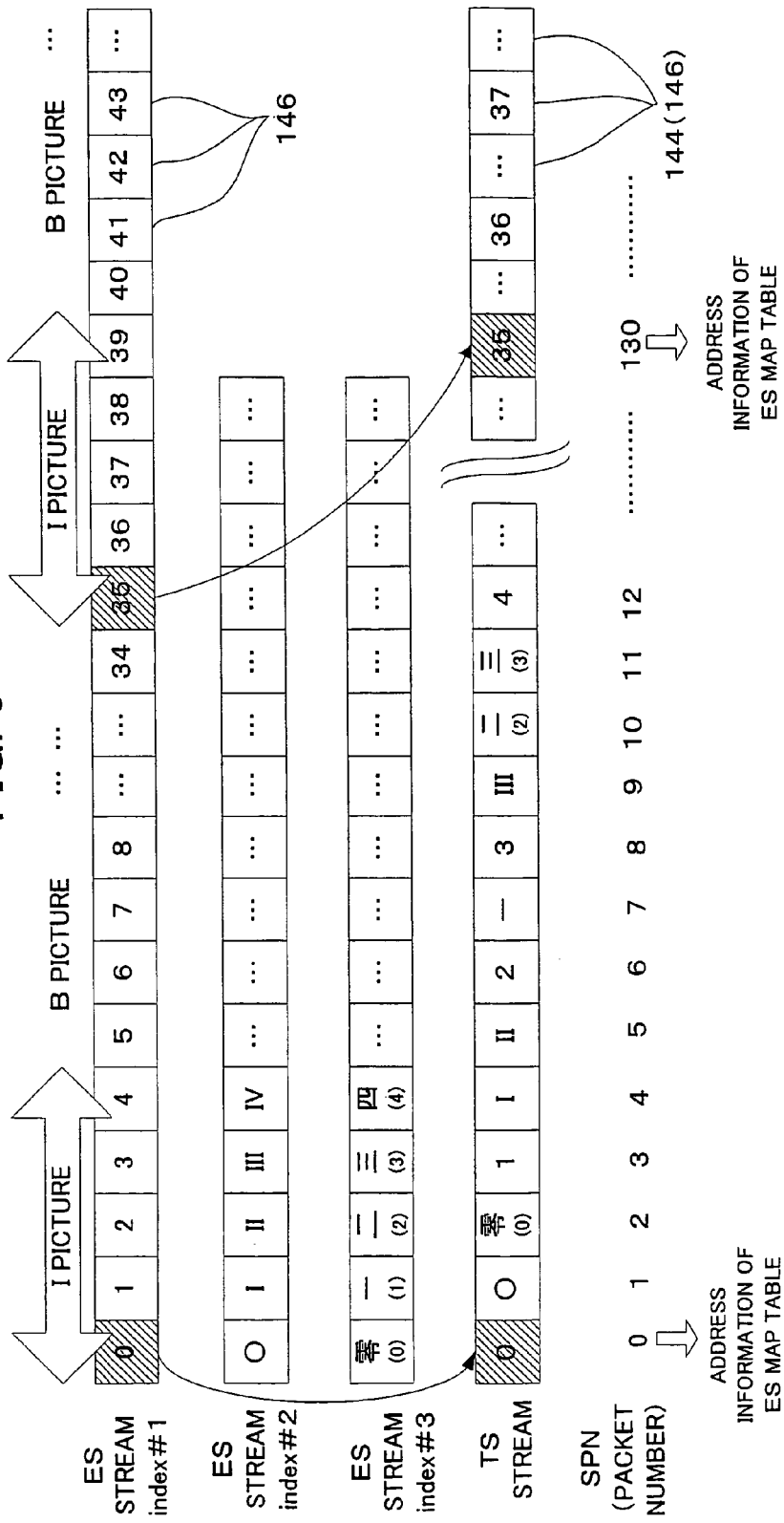
FIG. 9 is a schematic diagram showing one specific example of the data structure of source packets in the case where three elementary streams are multiplexed and one TS stream is recorded on the optical disc in the embodiment.
Figure 11:
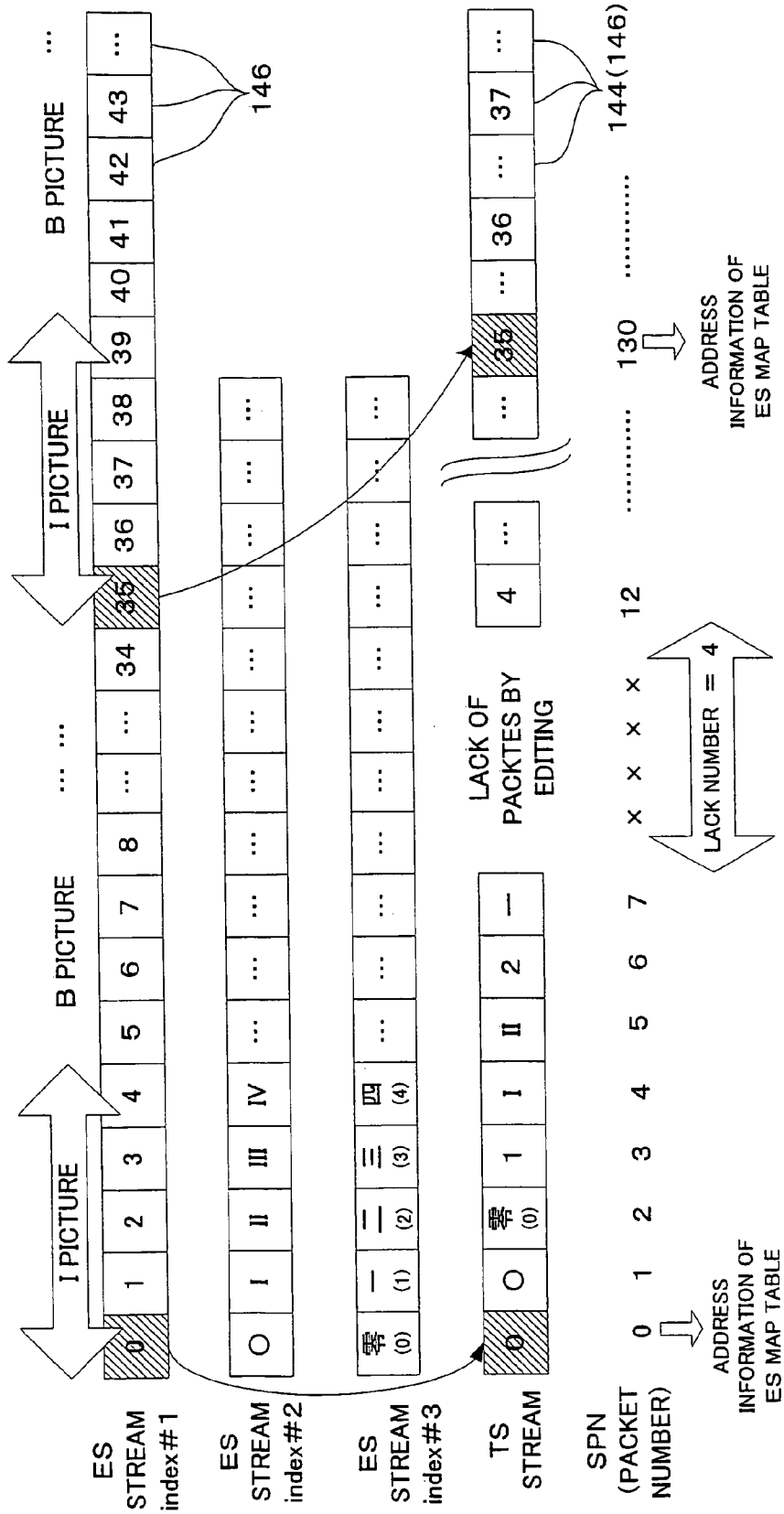
FIG. 11 is a schematic diagram showing another specific example of the source packet structure in the case where the source packet structure shown in FIG. 9 is changed by edit processing.

The structures related to these, and a recording/reproducing principle will be explained with reference to specific examples in FIG. 9 to FIG. 12. FIG. 9 schematically shows the data structure of the source packets 144 (refer to FIG. 4) in the case where three elementary streams to which index numbers (index) #1, #2, and #3 are given are multiplexed and one TS stream is recorded on the optical disc 100 explained with reference to FIG. 1 to FIG. 8, as one specific example (wherein the lateral direction corresponds to a time axis on which time goes to the right). Each of FIG. 10 schematically shows the data structure of the address information for each elementary stream (which is referred to as "ES address information" as occasion demands), which includes packet numbers (SPN) and display start time points and which is written on the ES map table 134 (refer to FIG. 3), for the relative one of the three elementary streams illustrated in FIG. 9. On the other hand, FIG. 11 schematically shows the source packet structure in the case where the source packet structure shown in FIG. 9 is changed by edit processing. FIG. 12 schematically shows the data structure of the discontinuity information, which includes the packet numbers (SPN) of packets which become starting points of discontinuity and the corresponding offset information and which is written on the AU table 131 (refer to FIG. 3).

In FIG. 9, the elementary stream with the index #1 on the top stream is a video stream provided with many TS packets 146, which are shown with squares having Arabic numerals 0, 1, 2, 3, and so on, wherein I pictures, B pictures, and P pictures are individually divided into a plurality of TS packets 146 and stored in accordance with the MPEG 2 standard.

The elementary stream with the index #2 on the next stream is another video, audio, or sub-picture stream provided with many TS packets 146, which are shown with squares having Roman numerals O, I, II, III, and so on. The elementary stream with the index #2 may or does not have to belong to the same AU as that of the elementary stream with the index #1.

The elementary stream with the index #3 on the next stream is another video, audio, or sub-picture stream provided with many TS packets 146, which are shown with squares having Chinese numerals 零(which means "0"), 一(which means "1"), 二(which means "2"), 三(which means "3"), and so on. The elementary stream with the index #3 may or does not have to belong to the same AU as that of the elementary stream with the index #1.

In the TS stream on the next stream, the TS packets 146 of these three elementary streams are multiplexed in the format of the source packet 144 (refer to FIG. 4), and the serial number (which is referred to as the "packet number (SPN)" as occasion demands) of the source packets 144 is logically given to each source packet 144 multiplexed, starting 0, 1, 2, 3, 4, and so on in ascending order.

In FIG. 9, the packet number (SPN) on the bottom line is logically given as a series of numbers over a relatively large-scale data range, such as within the same object data file 140 (refer to FIG. 3). Here, "is logically given" means that number information for indicating the packet number (SPN) is given to each source packet 144 on reproduction processing or record processing without writing it into the packet header 146a included in each source packet 144 or the like. Namely, the packet number (SPN) is a number for efficiently specifying or distinctively treating each packet in the reproduction processing or the record processing on the information reproducing or recording apparatus. On the basis of this number, various reproduction control information, such as the ES map table or ES address information described later, is prepared and written onto the optical disc 100.

In the specific example in FIG. 9, as individually shown in FIGS. 10(a), (b), and (c), all or one portion of the packet number (SPN), which belongs to each elementary stream, and the corresponding display start time point are written in the ES map table 134 (refer to FIG. 3), as being the ES address information 134a for the elementary streams with the indexes #1, #2, and #3. For example, as shown in FIG. 10(a), with respect to the elementary stream with the index #1, the packet number (SPN) of its head packet "0" is written, and "T 1_0" is written as the corresponding display start time point.

Especially in the embodiment, with respect to the elementary stream with the index #1, only the source packets 144 to which hatching is added in FIG. 9, i.e. only the packet numbers (SPN) of the source packets 144 which are the heads of the I pictures, are written as the ES address information 134a shown in FIG. 10(a). Only the packet numbers related to the I pictures are written because without firstly accessing the I pictures upon accessing the source packets 144, it is not possible to reproduce them even if other B pictures or P pictures are accessed. Moreover, that is because in order to reproduce one I picture which is usually divided into a plurality of source packets 144, it is enough to access the heads of the source packets 144. Therefore, it is possible to reduce the amount of information related to the ES address information 134a by writing such ES address information 134a with respect to the source packets 144 at the heads of the I pictures, which is useful.

As opposed to this, in FIG. 10(b) and FIG. 10(c), the packet number (SPN) of the source packet 144 corresponding to each elementary stream and the corresponding display start time point are written without such distinction of the I pictures, the B pictures, and the P pictures. If these elementary streams with the indexes #2 and #3 are the video streams of the MPEG 2 standard, as with the elementary stream with the index #1, they may be constructed to write the packet numbers (SPN) of the source packets 144 only in the I pictures. Moreover, they may be constructed to write the packet numbers (SPN) of the head source packets out of the source packets 144 only in the I pictures.

Incidentally, in the case where these elementary streams with the indexes #2 and #3 are the audio or sub-picture streams which belong to the same PU as that of the elementary stream with the index #1, i.e. in the case where they make a pair with the elementary stream with the index #1 in the sense of the contents, if the source packet 144 related to the elementary stream with the index #1 can be accessed, then from there it is possible to access the elementary streams with the indexes #2 and #3. Therefore, in this case, it is possible to omit the ES address information 134a as shown in FIG. 10(b) and FIG. 10(c), and further the ES map table 134, with respect to the elementary streams with the indexes #2 and #3. Such a construction makes it possible to further reduce the amount of information related to the ES address information 134a, which is extremely useful.

The preferred general registration rule of the ES address information 134a in the embodiment is not to prepare the ES address information 134a or the ES map table 134 of the audio stream in which a combination of the video stream and the audio stream is registered as the PU even if that is one combination. Moreover, even in the case of another PU, if the audio stream is registered by itself, it is possible to reduce the size of the ES map table 134 by using the ES address information 134a or the ES map table 134 of the video stream.

In the case of reproducing the optical disc 100 on which the ES address information 134a as shown in FIG. 10 is written, it is possible to calculate the logical address of a desired source packet 144 from the number of bytes of the source packet 144 which is a fixed length (e.g. 192 bytes) and its packet number (SPN) by firstly obtaining the ES address information 134a.

For example, in a source packet 144 with the packet number (SPN) shown in FIG. 10(a)=130, the logical address which follows or comes next to an address that is 130×192 bytes=24960 bytes away from the head of the object data file 140 (refer to FIG. 3) is the logical address of the source packet 144.

If the logical address is specified in this manner, the actual physical address can be easily specified as what corresponds to the logical address, by referring to the file system 105 (refer to FIG. 3).

Incidentally, for explanatory convenience, FIG. 9 (and FIG. 11) shows the alignment of packets as being the TS packets 146 in a condition before it is recorded onto the optical disc 100 at a stage before multiplexing (i.e. at the stage of the elementary stream), and it shows the alignment of packets as being the source packets 144 in a condition after it is recorded onto the optical disc 100 at a stage after multiplexing (i.e. at the stage of the TS stream). The source packet 144 is obtained by adding the packet arrival time stamp 145 or the like to the TS packet 146 (refer to FIG. 4). It is unnecessary to distinguish the both, upon considering the order and the alignment of the packets which are multiplexed, or the like. In short, the packet number (SPN) may be considered to be the serial number of the source packets 144, and it may also be considered to be the serial number of the TS packets 146.

Next, the structure related to the "discontinuity information" and record/reproduction processing will be explained.

Even in the object data with packet number (SPN) being continuous as shown in FIG. 9 at the beginning of recording, if the edit processing which is accompanied by the subsequent deleting and changing of the contents is performed, a discontinuous point is generated in the packet number (SPN), as shown in FIG. 11, by the lack of the source packets 144. Therefore, in order to make the above-described calculation "packet number×fixed byte" effective even after such editing, there arises a need to rewrite the ES address information 134a shown in FIG. 10 or the ES map table 134, or other various reproduction control information prepared on the basis of the packet number (SPN), at each time of editing (at least at each time of editing with the lack of the source packets 144). Incidentally, the "lack of the packets" means that the recording area of the source packet 144 is out of the control of the file system 105 (refer to FIG. 3) and becomes an unrecorded area or a rewritable area, and further that other data is written into the area under the control of the file system 105.

Particularly in the embodiment, if the discontinuous point is generated in the packet number (SPN) by the editing as in FIG. 11, various reproduction control information prepared on the basis of the packet number (SPN), such as the ES address information 134a shown in FIG. 10, is not rewritten, but discontinuity information 131C is additionally recorded as shown in FIG. 12.

As shown in FIG. 12, the discontinuity information 131C is constructed from information for indicating the packet number (SPN) from which discontinuity starts, that is, information for indicating the discontinuous point, and information for indicating an offset value at the point (which is equal to the number of the lacked source packets 144 "+1"). Such discontinuity information 131C is additionally recorded on an information recording/reproducing apparatus or an editing apparatus, at each time that the discontinuous point is generated by the editing.

Therefore, even if the discontinuous point is generated in the packet number (SPN) by the editing as shown in FIG. 11, when an address calculation based on the ES address information 134a about the source packet 144 to be accessed is subsequently performed, the logical address corresponding to the number of bytes, which is obtained by subtracting (ii) "the total amount of offset values associated with the discontinuous point existing between the head of the object data file and the source packet 144 to be accessed (the total amount of values obtained as one portion of the discontinuity information 131C)" from (i) "a value obtained by multiplying the packet number of the source packet 144 to be accessed with a fixed byte length (e.g. 192 bytes)", is the logical address of the source packet 144 to be accessed.

For example, it is assumed that it is the source packet 144 with the packet number (SPN)=130 shown in FIG. 10(a), and that there are discontinuous points at which the offset values are "5" and "10" in the packet numbers 12 and 18, respectively, which are between the packet number 0 and the packet number 130, as shown in FIG. 12. The logical address which follows an address that is 22464 bytes, which is obtained by multiplying the packet number: 130−{(5−1)+(10−1)} with the byte length of the packet 192 bytes, away from the head of the object data file 140 (refer to FIG. 3) is the logical address of the source packet 144 to be accessed.

More generally, it is assumed that out of the source packet numbers written in the ES address information 134a, the packet number of the source packet 144 to be accessed is SPN and that out of the offset values written in the discontinuity information, the offset value or values at the discontinuous point existing until the packet number SPN is $\Delta i$ ($i \geq 1$, natural number). The logical address which follows an address that is $\{SPN - \Sigma(\Delta i - 1)\} \times 192$ bytes is the logical address of the source packet 144 to be accessed.

As described above, according to the embodiment, if the ES address information 134a or the ES map table 134 is written once on the basis of the packet number (SPN) at the beginning of recording, it is unnecessary to rewrite the ES address information 134a or the ES map table 134 even if editing is subsequently performed. Therefore, it is possible to reduce a processing load, which is extremely useful. Moreover, since it is possible to access the desired source packet 144 by using the ES address information 134a written in this manner, a quick and easy access operation is possible. As a result, the reproduction processing, the record processing, or the edit processing on an information recording/reproducing apparatus described later is performed extremely efficiently, so that it is extremely useful in practice.

In addition, according to the embodiment, the discontinuity information 131C shown in FIG. 12 is common for each of the three elementary streams illustrated in FIG. 9 and FIG. 11. Therefore, even if a plurality of or many elementary streams are recorded onto one optical disc 100, it is necessary and sufficient to record only one discontinuity information 131C with respect to the AU table 131. Thus, in addition to save the recording capacity on the optical disc 100, it is possible to reduce a processing load which is associated with the writing of the reproduction control information accompanying the editing and which is associated with the reading of the reproduction control information in the subsequent reproduction processing, and it is extremely useful.

Incidentally, according to the access method, which uses the ES address information 134a and the discontinuity information 131C, explained in FIG. 9 to FIG. 12, in the case of a time search for specifying a reproduction time point directly or indirectly on the reproduction time axis, an information recording/reproducing apparatus described later accesses the source packet 144 close to the specified reproduction time point, by using the packet number (SPN) of the I picture or the like. Namely, it accesses the source packet 144 which is the closest to the specified reproduction time point or the source packet 144 which is the closest before or after the specified reproduction time point. In any case, there is hardly any or no problem in practice by accessing what is close to the specified reproduction time point (i.e. without exactly accessing with respect to the specified reproduction time point) because the I picture is generally recorded within one or several seconds on the reproduction time axis, for example.

As described above in detail, in the embodiment, the multiplexing and recording is performed on the optical disc 100 by a unit of the source packet 144 or the TS packet 146, and because of this, it is possible to multiplex-and-record onto the optical disc 100 the transport stream including many elementary streams as shown in FIG. 2(b). According to this embodiment, in the case of recording digital broadcasting onto the optical disc 100, a plurality of shows or programs can be recorded at the same time within the limit of the record rate. Here, it employs a method of multiplexing the plurality of shows or programs and recording them into one TS object 142. The embodiment of an information recording/reproducing apparatus executable this kind of record processing will be explained hereinafter.

(Information Recording/Reproducing Apparatus)

Figure 13:
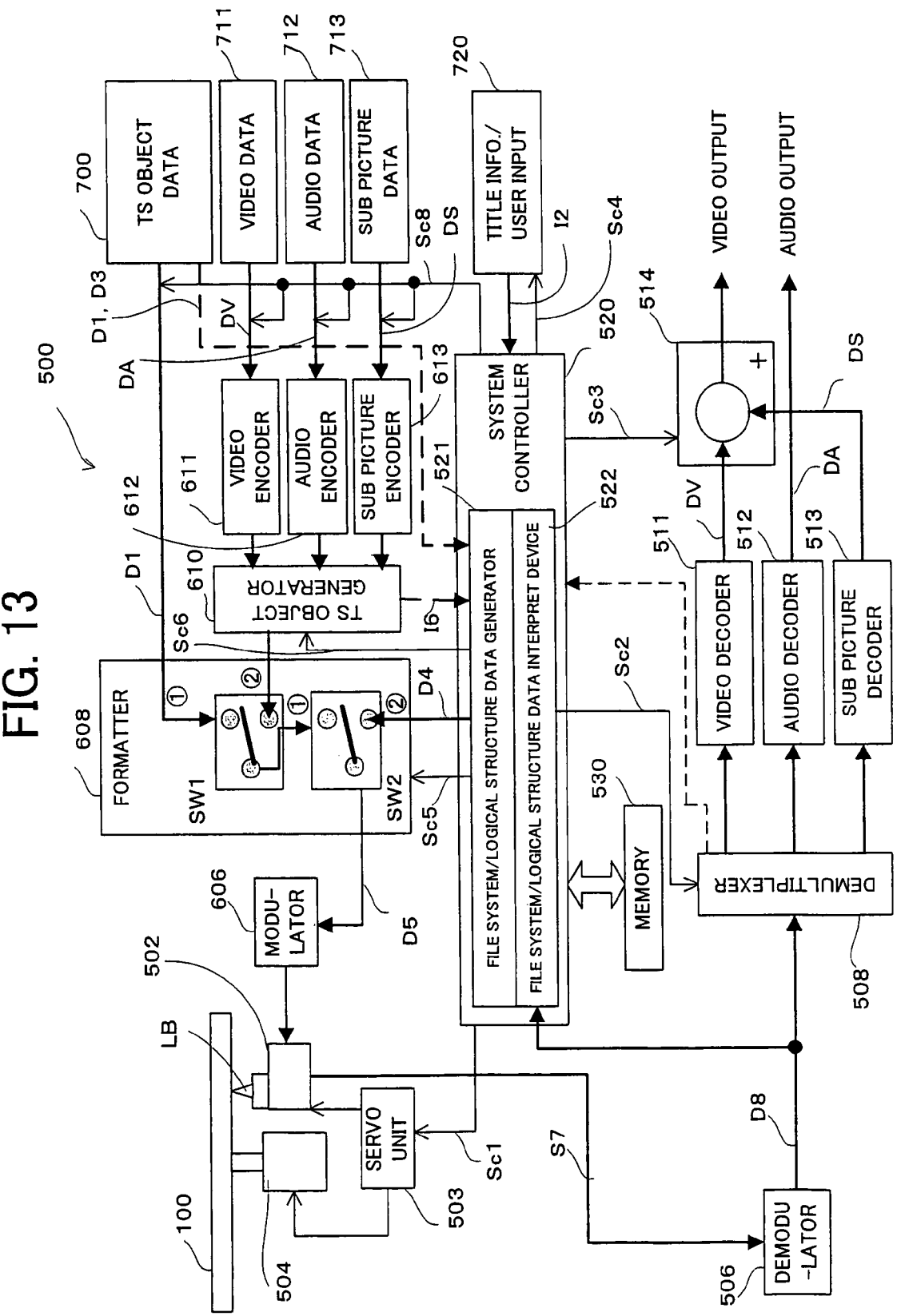
FIG. 13 is a block diagram showing an information recording/reproducing apparatus related to the embodiment of the present invention.

Next, the embodiment of the information recording/reproducing apparatus of the present invention will be explained with reference to FIG. 13 to FIG. 20. FIG. 13 is a block diagram of the information recording/reproducing apparatus, and FIG. 14 to FIG. 20 are flow charts showing its operation.

In FIG. 13, an information recording/reproducing apparatus 500 is classified broadly into a reproduction system and a record system, can record information onto the optical disc 100 described above, and can reproduce the information recorded on this. In this embodiment, the information recording/reproducing apparatus 500 is for recording and reproducing as described above, but it is possible to construct an embodiment of the recording apparatus of the present invention from the record system part of the information recording/reproducing apparatus 500. On the other hand, it is possible to construct an embodiment of the reproducing apparatus of the present invention from the reproduction system part of the information recording/reproducing apparatus 500.

The information recording/reproducing apparatus 500 is provided with: an optical pickup 502; a servo unit 503; a spindle motor 504; a demodulator 506; a demultiplexer 508; a video decoder 511; an audio decoder 512; a sub picture decoder 513; an adder 514; a system controller 520; a memory 530; a modulator 606; a formatter 608; a TS object generator 610; a video encoder 611; an audio encoder 612; and a sub picture encoder 613. The system controller 520 is provided with a file system/logical structure data generator 521; and a file system/logical structure data interpret device 522. Moreover, the memory 530 and a user interface 720 for the user input of the title information and the like are connected to the system controller 520.

Among these constitutional elements, the demodulator 506, the demultiplexer 508, the video decoder 511, the audio decoder 512, the sub picture decoder 513, and the adder 514 constitute the reproduction system, mostly. On the other hand, among these constitutional elements, the modulator 606, the formatter 608, the TS object generator 610, the video encoder 611, the audio encoder 612, and the sub picture encoder 613 constitute the record system, mostly. The optical pickup 502, the servo unit 503, the spindle motor 504, the system controller 520, the memory 530, and the user interface 720 for the user input of the title information and the like are shared for both the reproduction system and the record system, mostly. Moreover, a TS object data source 700, a video data source 711, an audio data source 712, and a sub picture source 713 are prepared for the record system. The file system/logical structure data generator 521 installed in the system controller 520 is mainly used in the record system, and the file system/logical structure data interpret device 522 is mainly used in the reproduction system.

The optical pickup 502 irradiates a light beam LB, such as a laser beam, onto the optical disc 100 with a first power as a reading light when reproducing, and with a second power as a writing light when recording while modulating it. The servo unit 503 is controlled by a control signal Sc1 outputted from the system controller 520 when reproducing and recording, and it performs a focus servo, a tracking servo, and the like at the optical pickup 502, as well as performing a spindle servo at the spindle motor 504. The spindle motor 504 is constructed to spin the optical disc 100 at a predetermined speed while receiving the spindle servo by the servo unit 503.

(i) Structure and Operation in Record System

Next, the specific structure and operation of each constitutional element constituting the record system in the information recording/reproducing apparatus 500 will be explained case by case, with reference to FIG. 13 to FIG. 17.

(i-1) The Case of Using the Already Prepared TS Object:

This case will be explained with reference to FIG. 13 and FIG. 14.

In FIG. 13, the TS object data source 700 is provided with a record storage, such as a video tape and a memory, and it stores TS object data D1.

Figure 14:
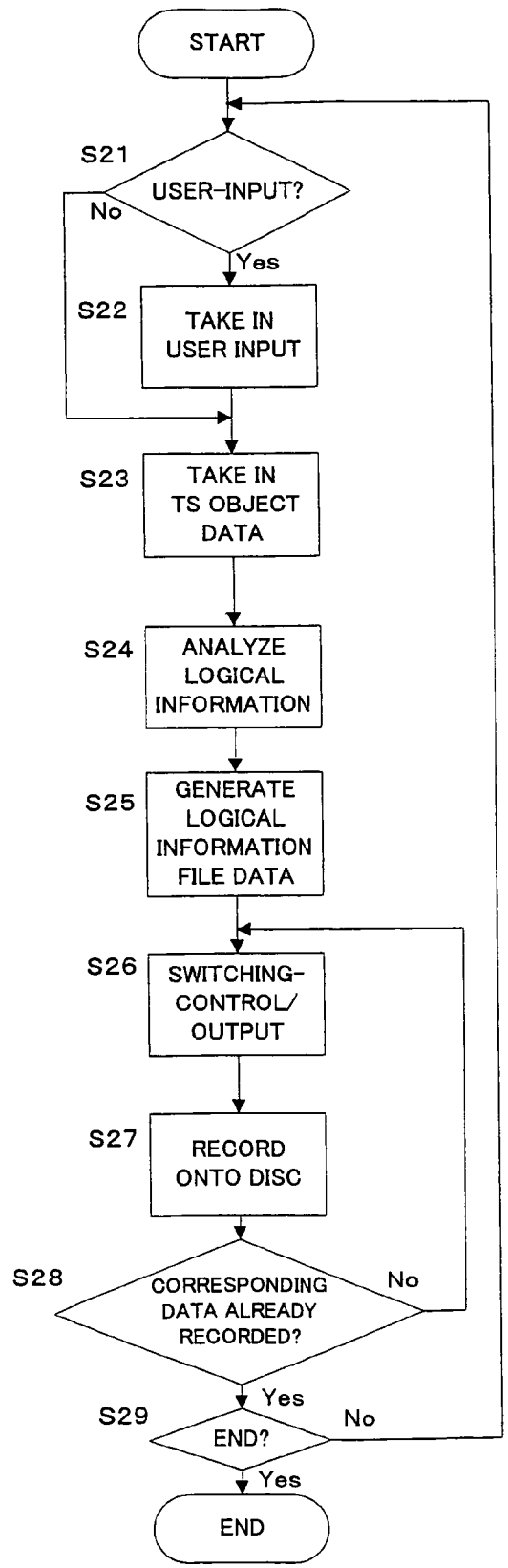
FIG. 14 is a flow chart showing a record operation (part 1) of the information recording/reproducing apparatus in the embodiment.

In FIG. 14, firstly, the information about each title (e.g. the structure content of a program list and the like) logically constructed on the optical disc 100 using the TS object data D1 is inputted from the user interface 720 to the system controller 520, as a user input I2 of the title information and the like. Then, the system controller 520 takes in the user input I2 of the title information and the like obtained from the user interface 720 (step S21: Yes and step S22). In this case, the user interface 720 is controlled by a control signal Sc4 from the system controller 520, and it can perform input processing according to the content to be recorded, such as choosing through a title menu screen. Incidentally, in the case where the user input has been already performed or the like (step S21: No), this processing is omitted.

Then, the TS object data source 700 is controlled by a control signal Sc8 giving an instruction for reading out the data from the system controller 520, and outputs the TS object data D1. Then, the system controller 520 takes in the TS object data D1 from the TS object source 700 (step S23), and performs the analysis of the data array of the TS object data D1 (e.g. a record data length and the like), the analysis of each elementary stream structure (e.g. understanding of ES_PID (Elementary Stream•Packet Identification number) as described later), and the like, by virtue of a TS analysis function of the file system/logical structure data generator 521, for example, on the basis of the PAT, the PMT, and the like packetized as well as the video data and the like as described above (step S24).

Then, the system controller 520 prepares the disc information file 110, the play list information file 120, the object information file 130, and the file system 105 (refer to FIG. 3), as logical information file data D4, by virtue of the file system/logical structure data generator 521, from the user input I2 of the taken-in title information and the like and from the analysis results of the data array of the TS object data D1 and each elementary stream (step S25). The memory 530 is used when preparing the logical information file data D4 described above.

Incidentally, such a variation that the data about the data array of the TS object data D1, the data about the construction information of each elementary stream, and the like are prepared in advance, is apparently and variously conceivable. Such a variation is also within the scope of the embodiment.

In FIG. 13, the formatter 608 is a device for performing a data array format to store onto the optical disc 100 the TS object data D1 and the logical information file data D4. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as output the logical information file data D4.

In a step S26 in FIG. 14, (i) the logical information file data D4 from the file system/logical structure data generator 521 in the step S25 or (ii) the TS object data D1 from the TS object data source 700 is outputted through the formatter 608 by the switching-control by the formatter 608 as constructed above (step S26).

The selection output from the formatter 608 is transmitted to the modulator 606 as disc image data D5, is modulated by the modulator 606, and is recorded onto the optical disc 100 through the optical pickup 502 (step S27). The system controller 520 also executes the disc record control in this case.

Then, if both the logical information file data D4 generated in the step S25 and the corresponding TS object data D2 have not been completely recorded yet, the operational flow returns to the step S26, continuing to the record (step S28: No). Incidentally, there is no preference in the record order of the logical information file data D4 and the corresponding TS object data D2.

On the other hand, if the both have been already recorded, it is judged whether or not the record on the optical disc 100 is supposed to be ended, on the basis of the presence or absence of an end command (step S29). If not supposed to be ended (step S29: No), the operational flow returns to the step S21, continuing the record processing. On the other hand, if supposed to be ended (step S29: Yes), a series of record processing ends.

As described above, the information recording/reproducing apparatus 500 performs the record processing in the case of using the already prepared TS object.

Incidentally, the example in FIG. 14 shows that the logical information file data D4 and the corresponding TS object data D2 are outputted in the step S26, after preparing the logical information file data D4 in the step S25. However, it is also possible to execute the output of the TS object data D2 and/or the record of the TS object data D2 onto the optical disc 100 before the step S25, and after or in parallel with this recording, it is possible to generate and record the logical information file data D4.

(i-2) The Case of Receiving and Recording the Transport Stream on Air

Figure 15:
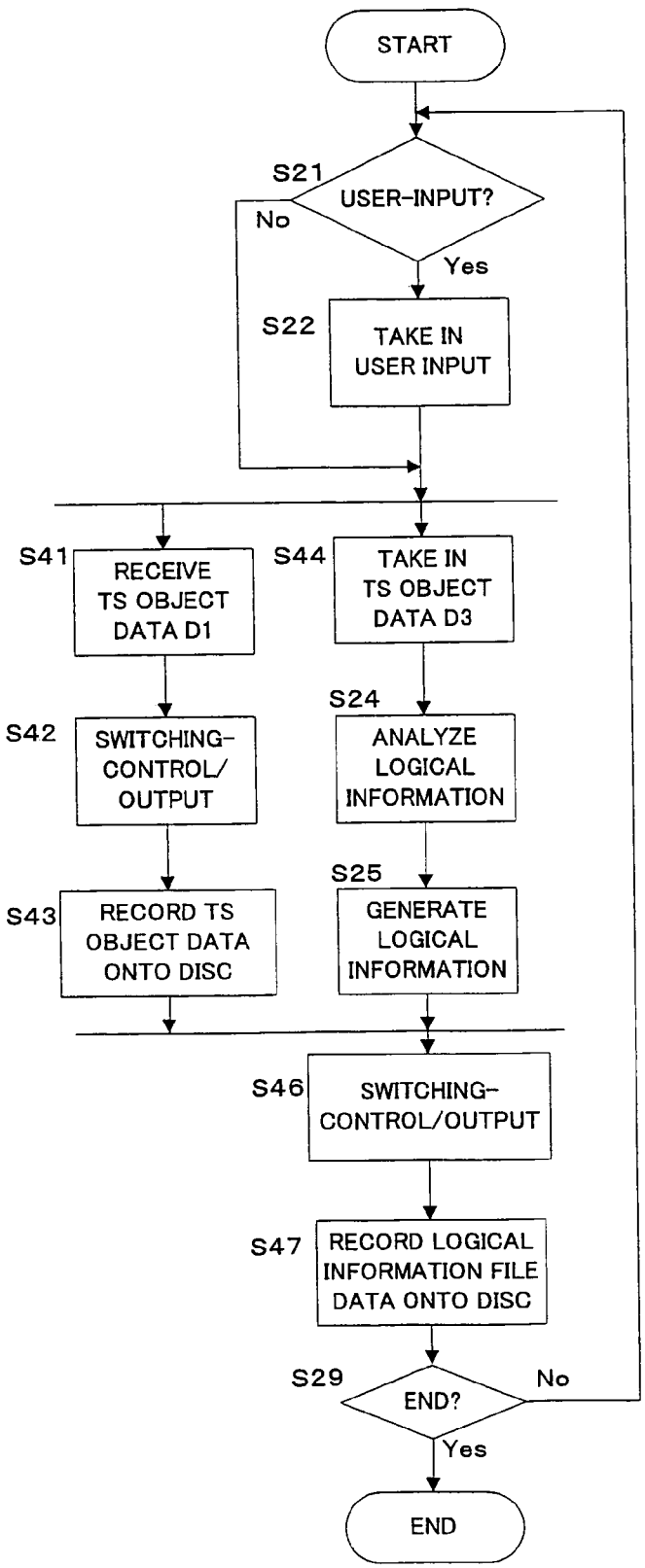
FIG. 15 is a flow chart showing a record operation (part 2) of the information recording/reproducing apparatus in the embodiment.

This case will be explained with reference to FIG. 13 and FIG. 15. Incidentally, in FIG. 15, the same steps as those in FIG. 14 have the same step reference numbers, and their explanation will be omitted as occasion demands.

Again, in this case, the similar processing is performed, as is "the case of using the already prepared TS object" described above. Therefore, focusing on the differences from this case, the explanation will be done hereinafter.

In the case of receiving and recording the transport stream on air, or the transport stream being broadcasted, the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the ES_PID information, as described later, which are deciphered upon receiving is taken into the system controller 520 and is stored into the memory 530 (step S44).

In the meantime, the TS object data D1 outputted to the formatter 608 is outputted to the modulator 606 by the switching-control of the formatter 608 (step S42), and is recorded onto the optical disc 100 (step S43).

Along with these operations, using the program construction information and the ES_PID information included in the reception information D3 taken-in upon receiving and stored in the memory 530, the file system/logical structure data generator 521 prepares the logical information file data D4 (step S24 and step S25). Then, after completing the record of a series of the TS object data D1, this logical information file data D4 is additionally recorded onto the optical disc 100 (step S46 and step S47). Incidentally, these step S24 and step S25 may be performed after the step S43.

Moreover, as the occasion demands (e.g. in the case of editing one portion of the title, or the like), by adding the user input I2 of the title information and the like from the user interface 720 to the program construction information and the ES_PID information stored in the memory 530, it is possible to prepare the logical information file data D4 by the system controller 520 and additionally record this onto the optical disc 100.

As described above, the information recording/reproducing apparatus 500 performs the record processing in the case of receiving the transport stream on air and recording it in real time.

Incidentally, if all the reception data obtained when broadcasting is once stored into an archive apparatus, and then, if this is used as the TS object source 700, the same processing as that in "the case of using the already prepared TS object" will do.

Figure 16:
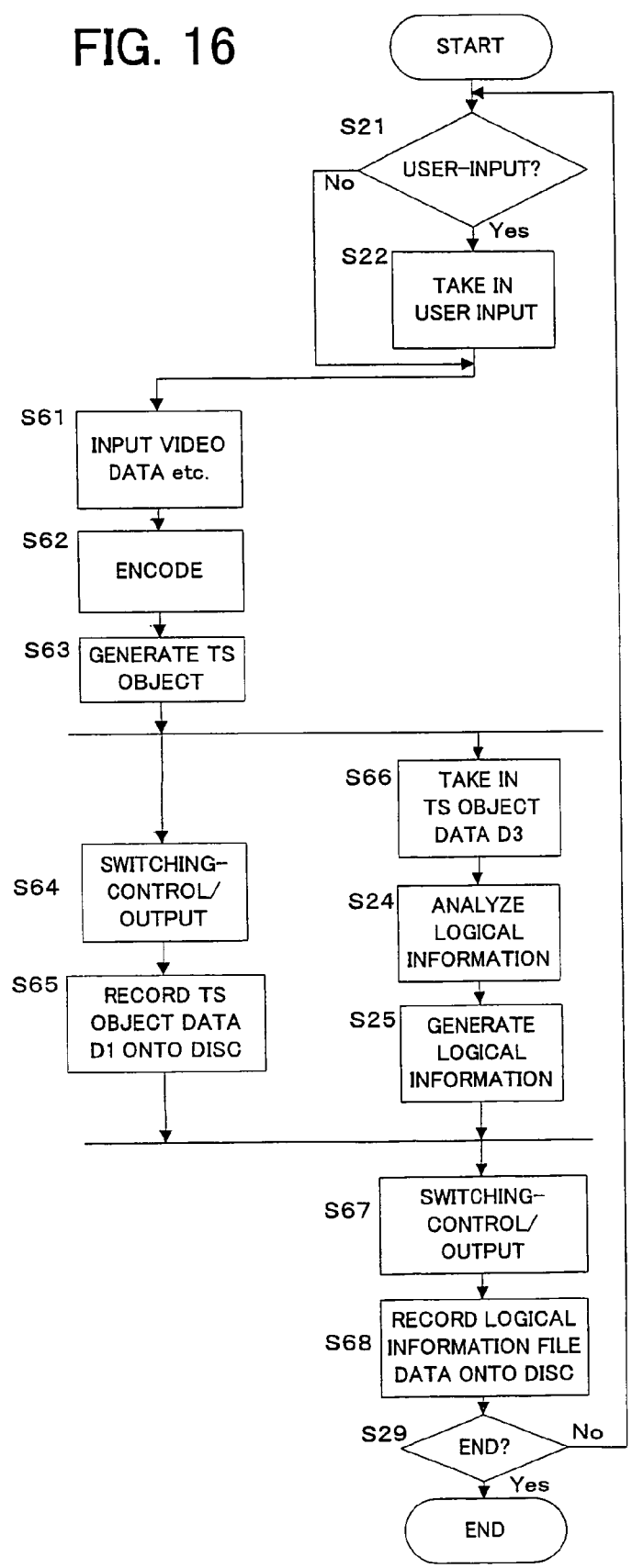
FIG. 16 is a flow chart showing a record operation (part 3) of the information recording/reproducing apparatus in the embodiment.

(i-3) The Case of Recording the Video Data, the Audio Data, and the Sub Picture Data This case will be explained with reference to FIG. 13 and FIG. 16. Incidentally, in FIG. 16, the same steps as those in FIG. 14 have the same step reference numbers, and their explanation will be omitted as occasion demands.

In the case of recording the video data, the audio data, and the sub picture data, which are individually prepared in advance, the video data source 711, the audio data source 712, and the sub picture data source 713 are individually provided with the record storage, such as a video tape and a memory, and store a video data DV, an audio data DA, and a sub picture data DS, respectively.

These data sources are controlled by the control signal Sc8 giving an instruction for reading out the data from the system controller 520, and they transmit the video data DV, the audio data DA, and the sub picture data DS, to the video encoder 611, the audio encoder 612, and the sub picture encoder 613, respectively (step S61). Then, the video encoder 611, the audio encoder 612, and the sub picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES_PID, as described later, and the like) are transmitted from the TS object generator 610 as information I6 to the system controller 520 and are stored into the memory 530 (step S66).

On the other hand, the TS object data generated by the TS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to change the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream taken into the memory 530 as the information I6, the file system/logical structure data generator 521 prepares the logical information file data D4 (step S24 and step S25). Then, after completing the record of a series of the TS object data D1, this is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input I2 such as the title information and the like form the user interface 720 onto these information stored in the memory 530, it is possible to prepare the logical information file data D4 with the file system/logical structure generator 521 and additionally record this onto the optical disc 100.

As described above, the information recording/reproducing apparatus 500 performs the record processing in the case of the recording the video data, the audio data, and the sub picture data, which are individually prepared in advance.

Incidentally, this record processing is applicable even when recording an arbitrary content the user has.

(i-4) The Case of Recording the Data by Authoring

Figure 17:
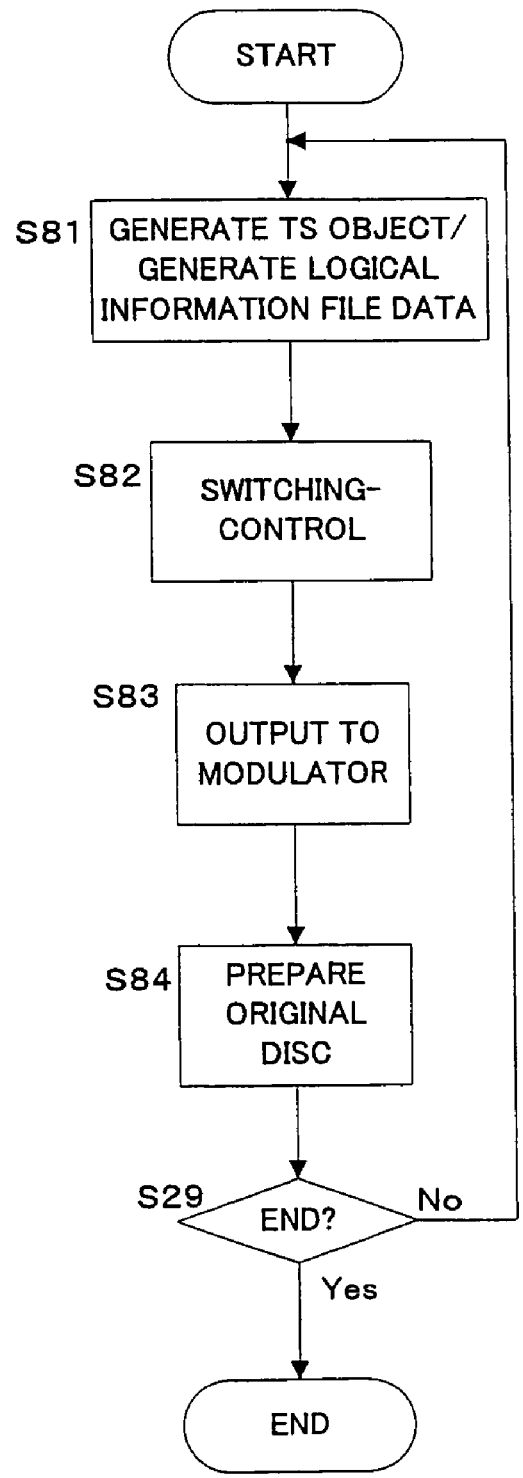
FIG. 17 is a flow chart showing a record operation (part 4) of the information recording/reproducing apparatus in the embodiment.

This case will be explained with reference to FIG. 13 and FIG. 17. Incidentally, in FIG. 17, the same steps as those in FIG. 14 have the same step reference numbers, and their explanation will be omitted as occasion demands.

In this case, by combining the above described three types of record processing in the three cases, an authoring system generates the TS object, the logical information file data, and the like in advance (step S81), and then completes the processing of switching-control performed at the formatter 608 (step S82). Then, the information obtained by this operation is transmitted to the modulator 606 equipped in front of and/or behind an original disc cutting machine, as the disc image data D5 (step S83), and this cutting machine prepares the original disc (step S84).

(ii) Structure and Operation in Reproduction System

Next, the specific structure and operation of each constitutional element constituting the reproduction system in the information recording/reproducing apparatus 500 will be explained with reference to FIG. 13 and FIG. 18 to FIG. 20.

The user interface 720 inputs the title to be reproduced, its reproduction condition, and the like to the system controller 520 as the user input I2 of the title information and the like. In this case, the user interface 720 is controlled by the control signal Sc4 from the system controller 520, and it can perform the input processing according to the content to be reproduced, such as choosing through a title menu screen.

Responding to this, the system controller 520 controls the disc reproduction with respect to the optical disc 100, and the optical pickup 502 transmits a reading signal S7 to the demodulator 506.

The demodulator 506 demodulates a recorded signal recorded on the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, as for the TS object data included in the demodulated data D8 as being a multiplexed information part, the demultiplexer 508 is controlled by a control signal Sc2 from the system controller 520 to demultiplex the TS object data. Here, the control signal Sc2 is transmitted so as to start demultiplexing when completing an access to a reproduction position address by the reproduction control of the system controller 520.

The demultiplexer 508 transmits and supplies the video packet, the audio packet, and the sub picture packet, to the video decoder 511, the audio decoder 512, and the sub picture decoder 513, respectively. Then, the video data DV, the audio data DA, and the sub picture data DS are respectively decoded.

Incidentally, the packets included in the transport stream, in each of which the PAT or the PMT is packetized as shown in FIG. 6, are respectively included as a part of the demodulated data D8; however, they are discarded or abandoned at the demultiplexer 508.

The adder 514 is controlled by a control signal Sc3 giving an instruction of the mixing from the system controller 520, and mixes or superimposes in a predetermined timing the video data DV and the sub picture data DS, which are respectively decoded at the vide decoder 511 and the sub picture decoder 513. The result is outputted as a video output from the information recording/reproducing apparatus 500 to a TV monitor, for example.

On the other hand, the audio data DA decoded at the audio decoder 512 is outputted as an audio output from the information recording/reproducing apparatus 500 to an external speaker, for example.

Here, the specific example of a reproduction processing routine by the system controller 520 will be explained with reference to FIG. 18.

Figure 18:
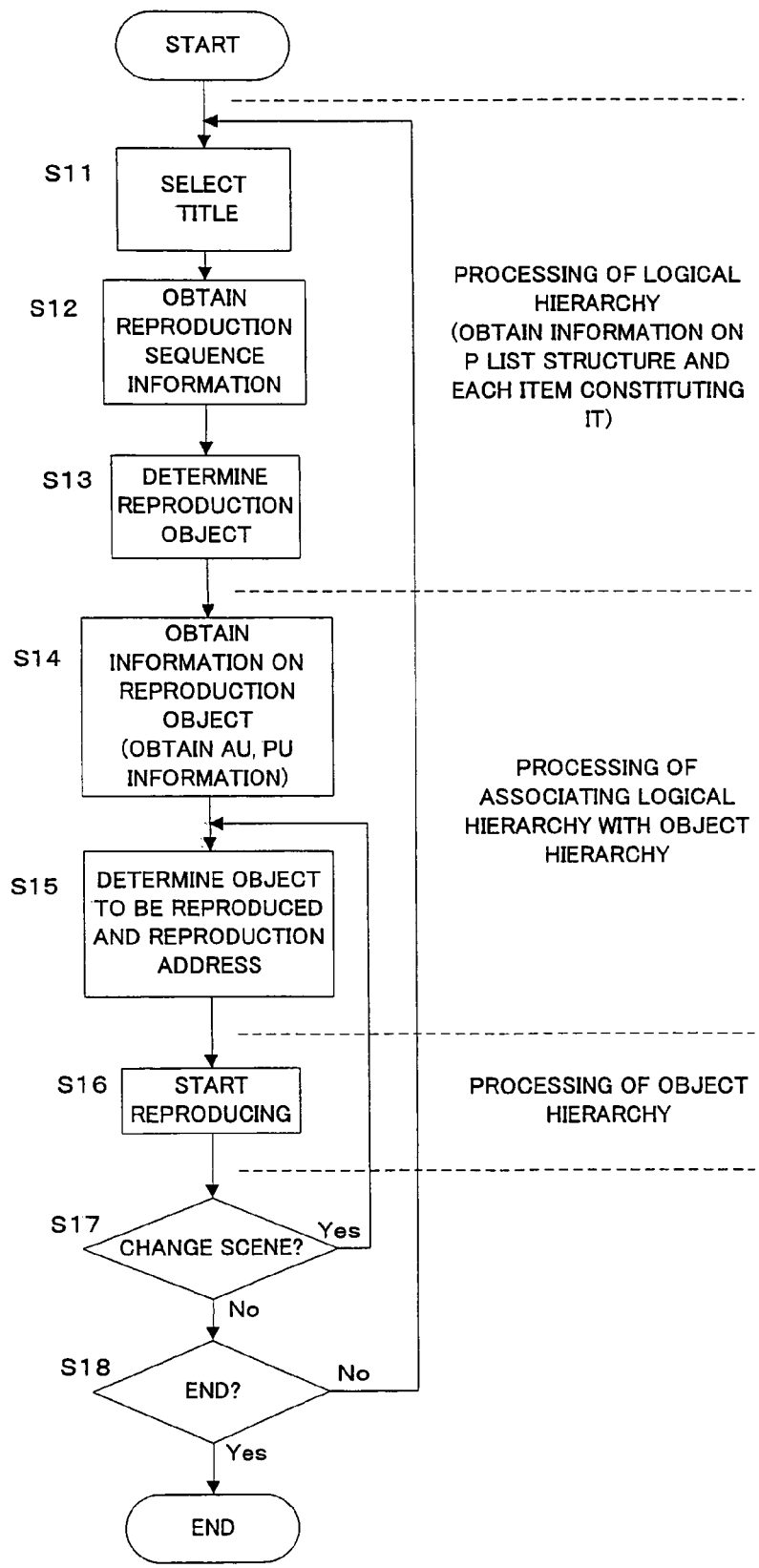
FIG. 18 is a flow chart showing a reproduction operation of the information recording/reproducing apparatus in the embodiment.

In FIG. 18, assume that as an initial condition, the recognition of the optical disc 100 in the reproduction system and the recognition of a volume structure and a file structure by the file system 105 (refer to FIG. 3) have been already completed by the system controller 520 and the file system/logical structure data interpret device 522 inside the system controller 520. Here, it will be explained the operational flow after obtaining the total number of the total titles from the disc comprehensive information 112 in the disc information file 110 and then choosing or selecting one title from among them.

Firstly, the choice or selection of the title is performed at the user interface 720 (step S11), and the system controller 520 obtains the information about the reproduction sequence from a reading result of the file system/logical structure data interpret device 522. More specifically, the processing of the logical hierarchy (i.e. obtaining the information for indicating a play list structure and the information about each of the Items constituting the play list structure (refer to FIG. 7)) is performed (step S12). By this, a reproduction object is determined (step S13).

Then, the object information file 130 related to the TS object as being the reproduction object is obtained. Especially in the embodiment, the AU information 132I and PU (Presentation Unit) information 302I, which will be described later, are also obtained as the information stored in the object information file 130 (step S14). These obtained information allow the association or correlation of the above described logical hierarchy and the object hierarchy (refer to FIG. 7).

Then, on the basis of the information obtained in the step S14, the object to be reproduced and the reproduction address are determined (step S15), and then the processing of the object hierarchy is started; namely, the actual reproduction is started (step S16).

While reproducing, it is monitored whether or not the command-input of a "scene change" corresponding to the change of the PU 302 in the AU 132 based on the PU information 302I and the AU information 132I, as described later is performed (step S17). If the "scene change" is command-inputted (step S17: Yes), the operational flow returns to the step S15, and the processes from the step S15 to the step S17 are repeatedly executed. On the other hand, if the "scene change" is not command-inputted (step S17: No), the presence or the absence of the command input indicative of ending the reproduction processing is judged (step S18). If there is not the command input indicating of ending (step S18: No), the operational flow returns to the step S11, and the processes inform the step S11 to the step S18 are repeatedly executed. On the other hand, if there is the command input indicative of ending (step S18: Yes), a series of the reproduction processing ends.

Here, in the above-described step S15, reproduction address determination processing upon accessing an arbitrary TS packet (or any source packet) by using the discontinuity information 131C, which is explained with reference to FIG.

Figure 19:
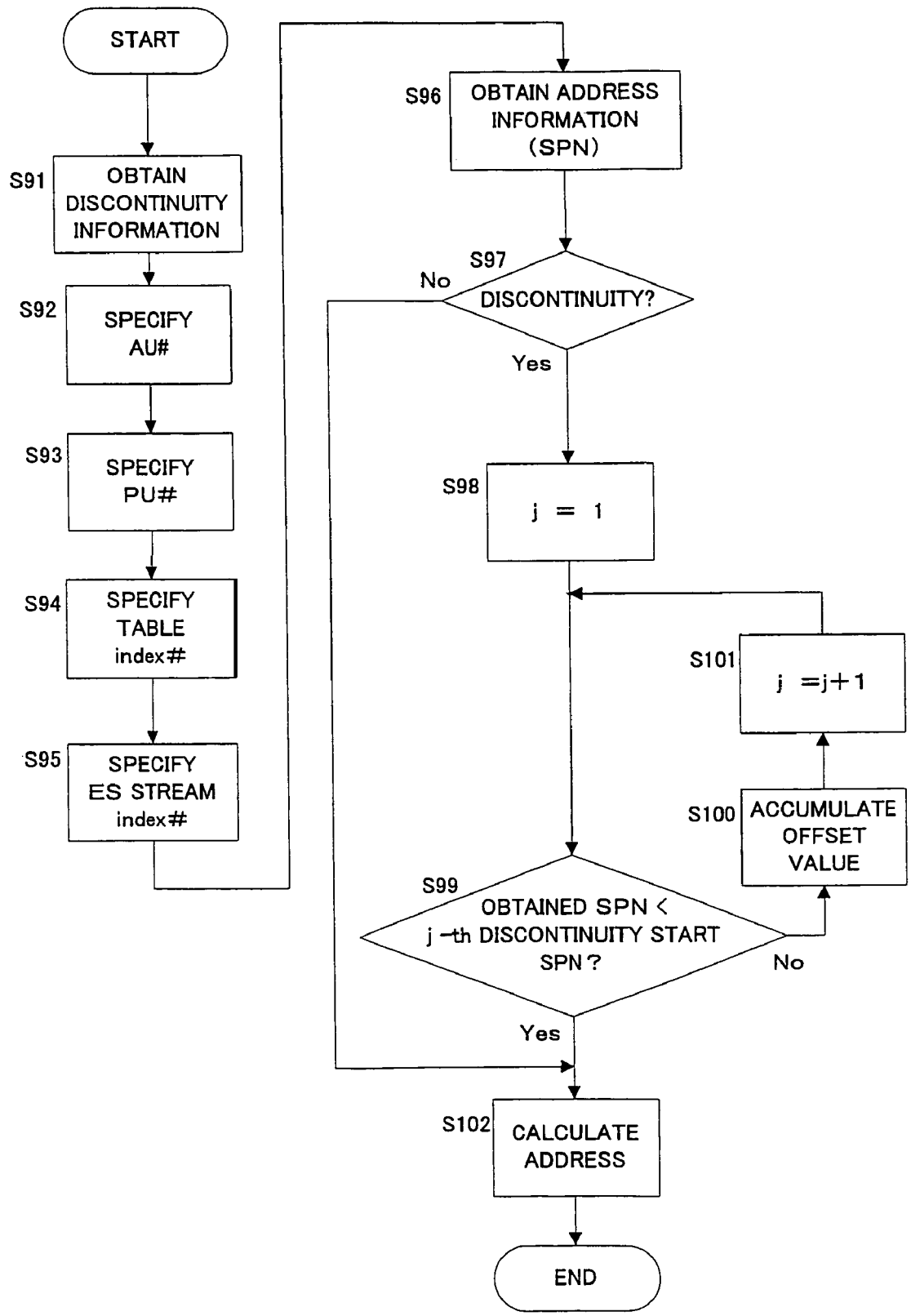
FIG. 19 is a flow chart showing one specific example of reproduction address determination processing during the reproduction operation in FIG. 18.
Figure 20:
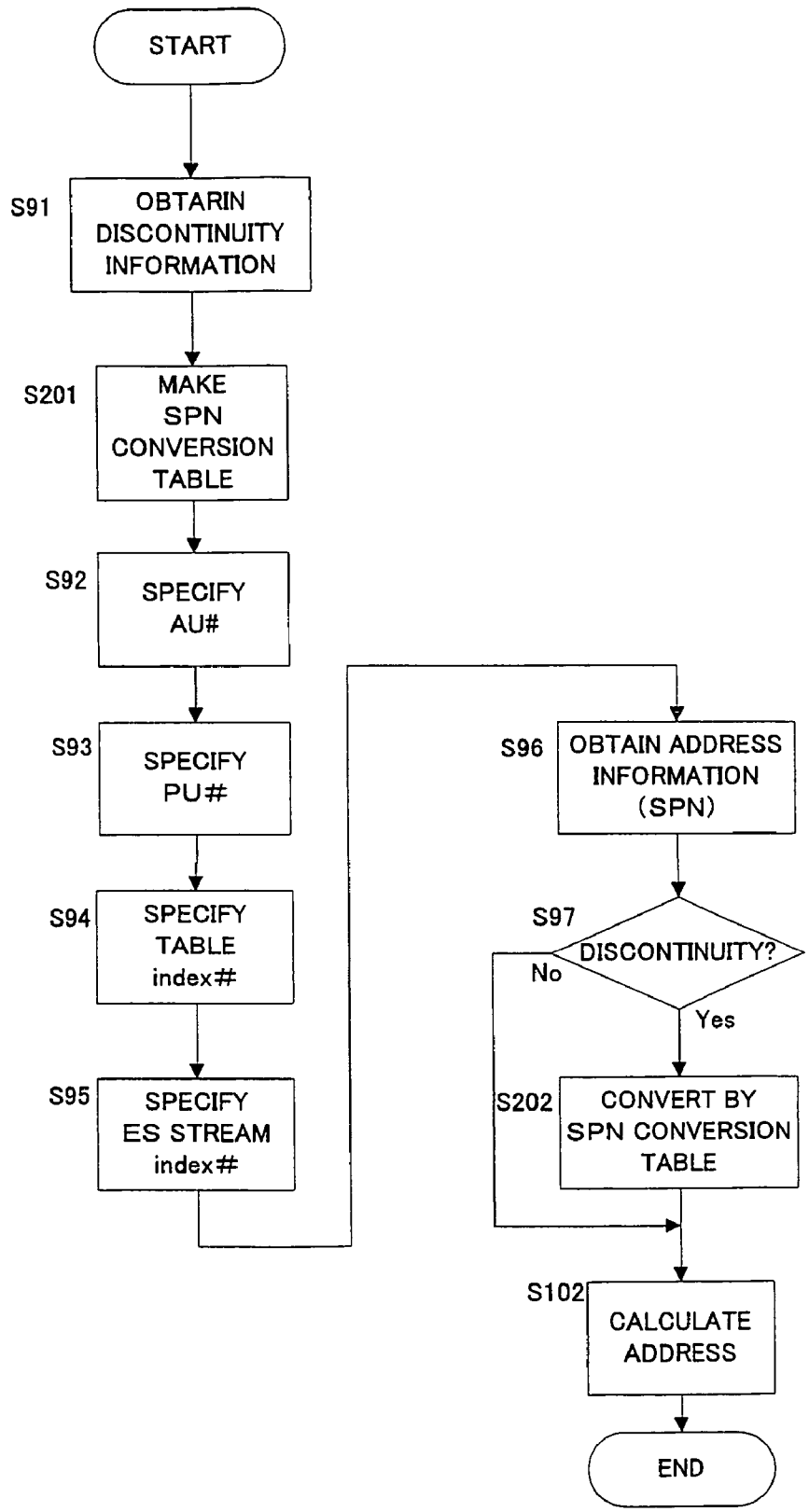
FIG. 20 is a flow chart showing another specific example of reproduction address determination processing during the reproduction operation in FIG. 18.

9 and FIG. 12, will be explained with reference to FIG. 19 and FIG. 20. FIG. 19 and FIG. 20 are flowcharts, each showing a specific example such reproduction address determination processing. Incidentally, in FIG. 20, the same steps as those in FIG. 19 have the same step reference numbers, and their explanation will be omitted as occasion demands. In the embodiment, it is possible to adopt any one of the reproduction address determination processing among them, for example.

In the specific example in FIG. 19, the discontinuity information 131C (refer to FIG. 12) included in the AU table 131 (refer to FIG. 3) obtained in the step S14 in FIG. 18 is obtained firstly (step S91).

On the other hand, the number of the AU (AU#) to which the elementary stream to be reproduced belongs is specified (step S92), and further, PU# to which the elementary stream corresponds is specified (step S93). Here, by referring to the AU table 131, the index number of the ES map table 134 (refer to FIG. 3) corresponding the specified AU# and PU# is specified (step S94), and the index number of the elementary stream to be reproduced is specified (step S95).

Then, the ES map table 134 specified in the step S94 is referred to, and from among this, the ES address information 134a (refer to FIG. 10) corresponding to the index number of the elementary stream specified in the step S95 is obtained. Namely, the packet number associated with the TS packet or the like at the head of the I picture included in this information and the corresponding display start time point are obtained (step S96).

Incidentally, the obtainment of the discontinuity information 131C in the step S91 may be performed after or in the middle of the step S92 to step S96.

The specific examples of the AU table 131 and the ES map table 134 referred to in the step S91 to the step S96 described above will be described later in detail with respect to FIG. 32.

Next, on the basis of the discontinuity information 131C obtained in the step S91, it is judged or determined whether or not there is discontinuity in the object data file 140 associated with the reproduction (step S97). Here, if there is no discontinuity (the step S97: No), the operational flow moves to a step S102 and the address calculation of the TS packet to be accessed is performed (the step S102). For example, the address is calculated by using a calculation, such as SPN×192 bytes, as described above.

On the other hand, if there is discontinuity in the step S97 (the step S97: Yes), a counter value j for counting the discontinuous point is set to be 1 (step S98), and it is judged whether or not the packet number (SPN) obtained in the step S96 is smaller than the smallest discontinuity start SPN indicated by the discontinuity information (step S99). Here, if it is smaller (the step S99: Yes), it is unnecessary to perform the access crossing the discontinuous point, and the access calculation can be performed even if the discontinuous point is ignored. Thus, the operational flow moves to the step S102 and the address calculation is performed.

Incidentally, it is also possible to omit the judgment processing in the step S97 and process the case with no discontinuity (the step S97: No) as one type of the case in which there is not any discontinuous point before a point to be accessed (the step S99: Yes).

If it is not smaller in the step S99 (the step S99: No), there is the j-th discontinuous point before the TS packet to be accessed, so that the offset value which corresponds to this and which is indicated by the discontinuity information 131C is accumulated by using a predetermined area for the memory or the like (step S100). Then, the counter value j for counting the discontinuous point is incremented by +1 (step S101). The operational flow returns to the step S99, and the processing after the step S99 is repeated and performed.

After that, in the step S99, it is judged by the judgment at any time point that the SPN obtained in the step S96 is smaller (the step S99: Yes), and the operational flow moves to the step S102. Then, by using the offset value accumulated by the step S100 at this time point, the address calculation of the TS packet to be accessed is performed (the step S102). Here, for example, the address is calculated by using a calculation, such as $\{SPN-\Sigma(\Delta i-1)\}\times 192$ bytes, as described above.

As described above, according to the specific example of the reproduction address determination processing shown in FIG. 19, it is possible to specify an arbitrary address in almost real time during the reproduction by specially using the ES address information 134a and the discontinuity information 131C.

In the specific example in FIG. 20, the discontinuity information 131C (refer to FIG. 12) included in the AU table 131 (refer to FIG. 3) obtained in the step S14 in FIG. 18 is obtained firstly (the step S91).

Particularly in the specific example, a SPN conversion table is made at this stage in a cash memory or the like built in the information recording/reproducing apparatus (step S201). More specifically, a correspondence relationship between the packet number (SPN) at the beginning of recording and the serial number of the packets (SPN') after the discontinuous point is generated through the subsequent editing is made in advance as the SPN conversion table and maintained in the cash memory or the like.

After that, the step S95 to the step S97 are performed in the same manner as the specific example in FIG. 19. If there is discontinuity in the step S97 (the step S97: Yes), the serial number of the packets (SPN') after the discontinuous point is generated through the editing is converted into the continuous packet number (SPN) at the beginning of recording, by referring to the SPN conversion table made in advance in the step S201 (step S202). Namely, the packet number (SPN'), which is expected to be moved forward by the lacked TS packet or packets if the TS packet number is counted in ascending order from the head in the object data file 140 without change, is converted into the packet number (SPN), which is obtained if there is the lacked TS packet or packets.

After that, in the step S102, the address calculation of the TS packet to be accessed is performed (the step S102). For example, the address is calculated by using a calculation, such as SPN×192 bytes, which uses the packet number (SPN) after the conversion, as described above.

The making of the SPN conversion table in the step S201 may be performed by a unit of the optical disc 100, or by a unit of the object data file 140. In short, this may be maintained for the entire period or for one portion of the period of the reproduction processing after the making in advance, within an allowable range of the capacity of the cash memory or the like, and this may be used for the conversion processing in the step S202.

As described above, according to the specific example of the reproduction address determination processing shown in FIG. 20, it is possible to specify an arbitrary address on the basis of the SPN conversion table made in advance, by specially using the ES address information 134a and the discontinuity information 131C.

Figure 21:
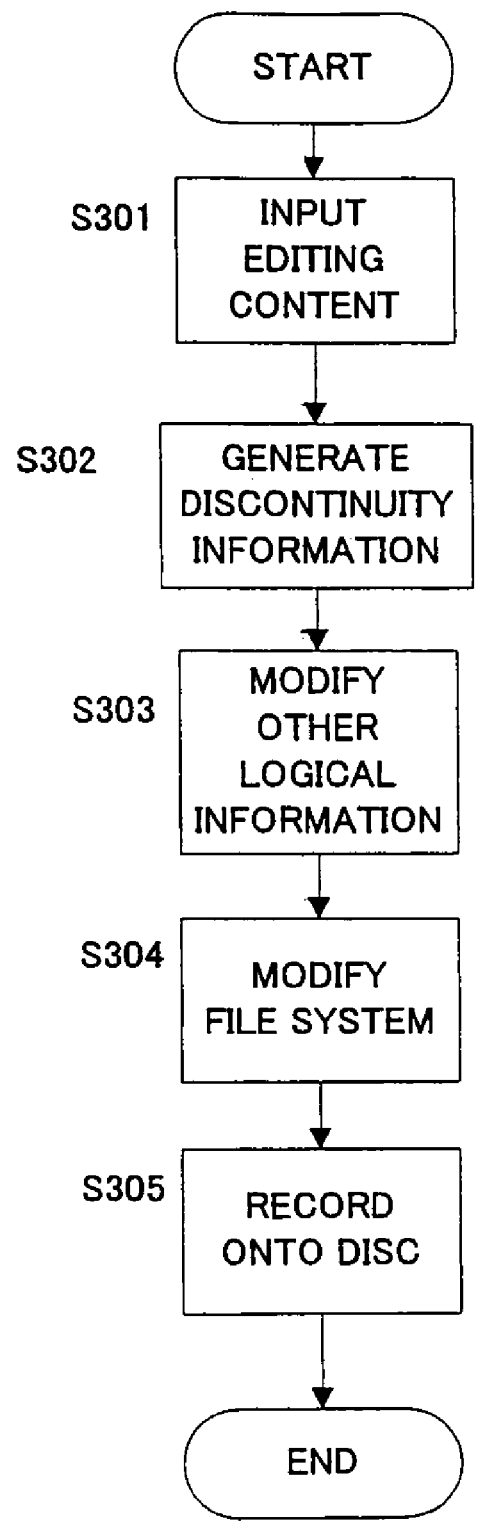
FIG. 21 is a flow chart showing the edit processing of the information recording/reproducing apparatus in the embodiment.

(iii) Operation of Record System and Reproduction System in Editing:

Next, with reference to FIG. 21, the edit processing of the information recording/reproducing apparatus 500 shown in FIG. 13 will be explained. FIG. 21 is a flow chart showing the edit processing of the information recording/reproducing apparatus 500.

Here, as a precondition, it is assumed that the object data file 140 is completed on the optical disc 100 and that on the basis of the corresponding packet number (SPN) shown in FIG. 9, the object information file 130 including the logical information, such as the AU table 131 and the ES map table 134 including the ES address information 134a or the like as shown in FIG. 10, or the like is also completed. Under this precondition, such a case that the edit processing which is accompanied by the lack of some source packets (or TS packets) is performed, as shown in FIG. 11, will be taken as an example and explained.

Firstly, the editing content is inputted by the user interface 720 (step S301). This causes a lacking point of the packet, as shown in FIG. 11, in the TS stream shown in FIG. 9, and the packet number (SPN) becomes discontinuous. Then, the system controller 520 takes in the additional content.

Next, the discontinuity information 131C as shown in FIG. 12 is generated by the file system/logical structure data generator 521 on the basis of the additional content taken-in in the step S91 (step S302).

Then, information required for modification according to the editing content, such as the title information table in the disc information file and a title play list in the play list information file, is modified by the file system/logical structure data generator 521 on the basis of the additional content taken-in in the step S91 (step S303). Here, the ES address information 134a shown in FIG. 10 or the ES map table 134 are not particularly modified.

Then, the file system 105 is modified by the file system/logical structure data generator 521 according to the modification of the disc information file 110 (step S304). For example, the area in which the lacked source packet or packets are recorded before the editing is opened as a recordable area.

Incidentally, the processing in the above-described step S302 to step S304 may be in the reverse order each other.

After that, under the control by the system controller 520, various information made or modified in the above-described step S302 to step S304 is recorded onto the optical disc 100 (step S305), and a series of the edit processing is ended.

According to the embodiment, as explained above, the lack of the TS packet or packets, i.e. the discontinuity of the packet number, generated by the editing is coped with, by generating and additionally recording the discontinuity information 131C without generating or modifying the ES address information 134a, so that the efficient edit processing is possible as a whole.

In addition, according to the embodiment, even if some object information or the like becomes unnecessary as a result of performing the editing as described above, such a data structure that the object information or the like which becomes unnecessary does not have to be referred to is adopted in the subsequent reproduction processing. Thus, in editing, it is actually unnecessary to delete the object information or the like which becomes unnecessary from the table or the like, so that it is advantageous from the viewpoint of reducing a processing load.

Incidentally, in the above-explained edit processing, if one video stream is edited, it is necessary to perform the address specification using the discontinuity information 131C, even for other video streams synchronously recorded as what belong to the same AU and for a video stream or the like associated with another AU recorded after the recording of the AU is completed or the like, as long as they are recorded into the object data file 140. Regardless of whether to be in the same AU or to be in a different AU, it is possible to specify the address shown in FIG. 19 and FIG. 20 by using the common discontinuity information 131C.

(Access Flow in Reproducing)

Figure 22:
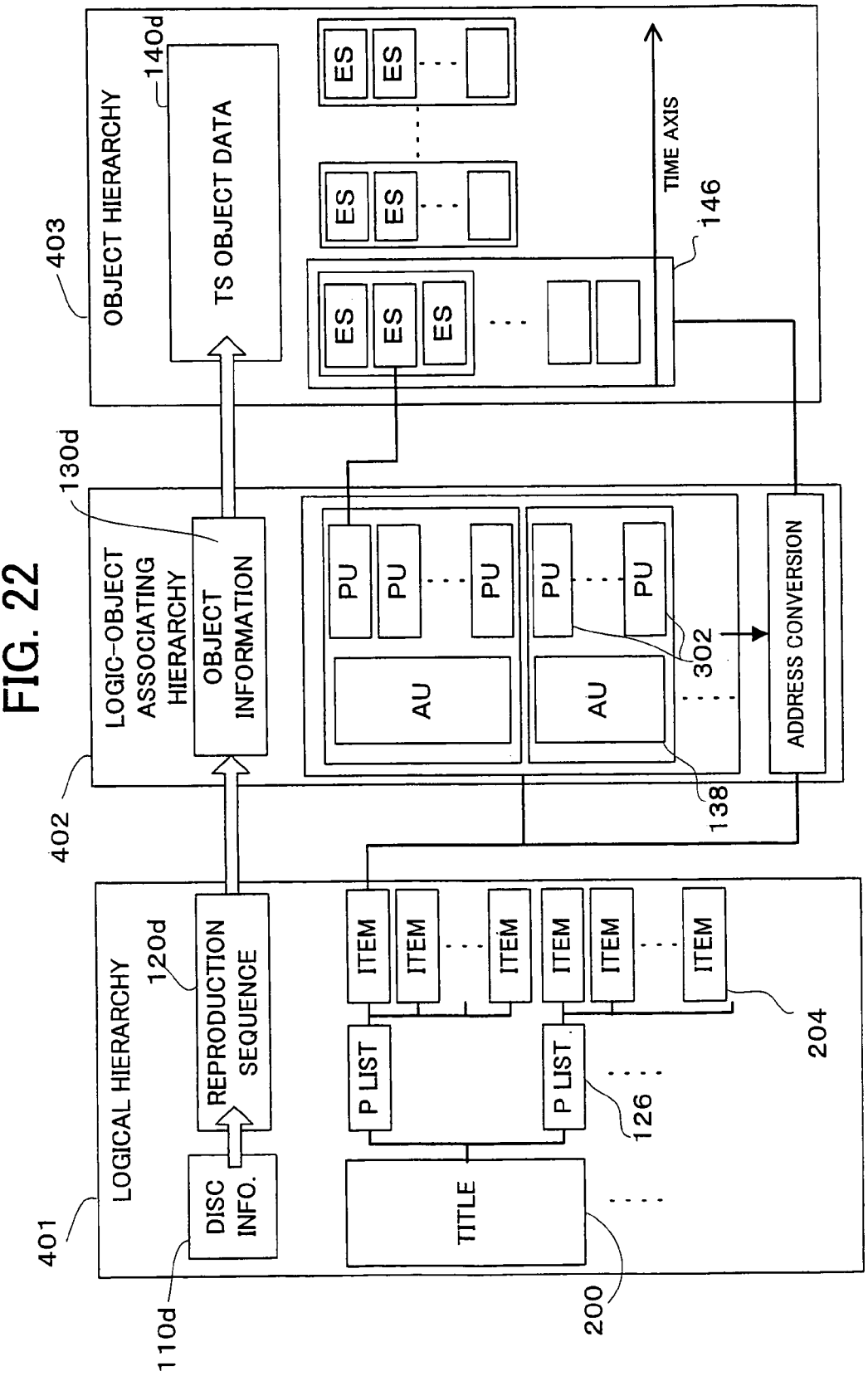
FIG. 22 is a schematic diagram showing an entire access flow in reproducing, in relation to the logical structure of the optical disc in the embodiment.

Next, with reference to FIG. 22, the flow of the access in reproducing at the information recording/reproducing apparatus 500, which uses the AU information 132I and the PU information 302I, as one of the features of this embodiment, will be explained as well as the logical structure of the optical disc 100. FIG. 22 is a schematic diagram showing an entire flow of the access in reproducing, in relation to the logical structure of the optical disc 100.

In FIG. 22, the logical structure of the optical disc 100 is categorized broadly into the following three hierarchies: a logical hierarchy 401; an object hierarchy 403; and a logic-object associating hierarchy 402 mutually associating those two hierarchies.

Among them, the logical hierarchy 401 is a hierarchy that logically specifies various logical information to reproduce the desired title when reproducing, as well as the play list to be reproduced and its construction content. In the logical hierarchy 401, disc information 110d indicating the entire titles 200 and the like on the optical disc 100 is written within the disc information file 110 (refer to FIG. 3), and further, reproduction sequence information 120d of the entire contents on the optical disc 100 is written within the play list information file 120 (refer to FIG. 3). More specifically, the construction of one or a plurality of play lists 126 is written in each title 200 as the reproduction sequence information 120d, and the construction of one or a plurality of Items 204 is written in each play list 126. Then, in accessing at the time of the reproduction, the logical hierarchy 401 as described above specifies the title 200 to be reproduced, the play list 126 corresponding to this, and further the Item 204 corresponding to this.

Then, the logic-object associating hierarchy 402 is a hierarchy that specifies the attribute and the physical storing address of the TS object data 140d to be reproduced, so as to specify the combination and/or the construction of the TS object data 140d as being the entity data and perform an address conversion to the object hierarchy 403 from the logical hierarchy 401, on the basis of the information specified in the logical hierarchy 401 as described above. More specifically, in the logic-object associating hierarchy 402, the object information data 130d, which separates a group of the contents constituting each Item 204 into units of the AU 132 and which finely separates each AU 132 into units of the PU 302, is written in the object information file 130 (refer to FIG. 3).

Here, "the PU (Presentation Unit) 302" is one example of "a sub group" in the present invention, and is a unit of associating and grouping a plurality of elementary streams for each unit of changing the reproduction. For example, as is the title #1 in the specific examples shown later in FIG. 23 to FIG. 29, the PU 302 is a unit of grouping the elementary stream packet ID (ES_PID) and the like for each vision of a "multi-vision title". If there are three audio streams in this PU 302, the user can also freely change three audio (e.g. audio in different languages and the like) while reproducing this vision.

On the other hand, "the AU (Associate Unit) 132" is a unit of associating or grouping a plurality of elementary streams, such as the video stream, in the TS object used in one title, and is a group of one or a plurality of PUs 302. More specifically, the AU 132 is a unit of grouping the elementary stream packet ID (ES_PID) for each TS object, indirectly through the PU 302. This AU 132 corresponds to a group of a plurality of shows or programs mutually having a special relationship considering the contents, for example, a plurality of shows or programs mutually changeable in multiple broadcasting and the like. Then, the PU 302 belongs to the same AU 132 and corresponds to a group of one or a plurality of elementary streams, which constitute a plurality of shows or programs mutually changeable by the user operation when reproducing.

Therefore, if the AU 132 to be reproduced is specified, and moreover, the PU 302 is specified, then the elementary stream to be reproduced is specified. Namely, even if not using the PAT nor the PMT shown in FIG. 6, it becomes possible to reproduce the desired elementary stream from among the multiplexed and recorded elementary streams from the optical disc 100.

The more specific data structure of the AU information 132I and the PU information 302I, which respectively define the AU 132 and the PU 302 described above, will be explained later with reference to FIG. 32.

Here, the elementary stream that is actually reproduced is identified or specified by the ES_PID, which is the packet ID of the elementary stream (refer to FIG. 6), from the PU information 302I. At the same time, by converting the information indicating the starting time and the ending time of the reproduction to the address information of the elementary stream, the content in a specific area (or specific time range) of a specific elementary stream is reproduced.

In this manner, in the logic-object associating hierarchy 402, the address conversion to the physical address related to each PU 302 from the logical address related to each Item 204 is executed.

Then, the object hierarchy 403 is a physical hierarchy to reproduce the actual TS object data 140d. In the object hierarchy 403, the TS object data 140d is written within the object data file 140 (refer to FIG. 3). More specifically, the TS packets 146 constituting a plurality of elementary streams (ES) are multiplexed at each time point, and the arrangement of the TS packets 146 along the time axis enables a plurality of elementary streams to be constructed (refer to FIG. 5). Then, the plurality of TS packets 146 multiplexed at each time point are associated with the PU 302 identified at the logic-object associating hierarchy 402, for each elementary stream. Incidentally, it is also possible to associate a plurality of PUs 302 with one elementary stream (e.g. to share the elementary stream related to the same audio data and/or the elementary stream related to the same sub picture data, among a plurality of changeable shows or programs).

In this manner, in the object hierarchy 403, the actual object data is reproduced using the physical address obtained by the conversion at the logic-object associating hierarchy 402.

As described above, the three hierarchies shown in FIG. 22 allow the execution of the access with respect to the optical disc 100 in reproducing.

(Specific Example of Data Structure Recorded on Optical Disc)

Next, with reference to FIG. 23 to FIG. 28, the data structure on the optical disc 100 on which the AU (Associate Unit) information and the PU (Presentation Unit) information, as one of the features of this embodiment, are recorded will be explained, in addition to the PAT (Program Association Table) and the PMT (Program Map Table), as one of the features of the transport stream.

In this specific example, it will be explained the data structure constructed on the optical disc 100 in the case of constructing two titles within the optical disc 100 with respect to the object provided with the three TS objects #1, #2, and #3.

FIG. 23 schematically shows the data structures of TS objects #1 and #2 including a plurality of elementary streams in this specific example. FIG. 24 schematically shows the data structures of the PAT and the PMT of the TS object #1 in this specific example. FIG. 25 schematically shows the data structures of a PAT and a PMT of the TS object #2 in this specific. FIG. 26 schematically shows the data structure of the TS object #3 in this specific example. FIG. 27 schematically shows the data structures of a PAT and a PMT of the TS object #3 in this specific example. FIG. 28 schematically shows the data structure finally constructed on the optical disc 100 in this specific example.

Firstly, as shown in FIG. 23, the title #1 is constructed by using the TS #1 object and the TS #2 object as they are, with the transport stream that is used in digital broadcasting as those two TS objects 142 (refer to FIG. 3). The "show 1" in FIG. 23 is the binary broadcasting which uses two programs, whose program map packet IDs ("Program Map PIDs" in FIG. 23) are "100" and "200" that have program numbers ("Program No" in FIG. 23) "1" and "2", respectively. On the other hand, the "show 2" in FIG. 23 is normal broadcasting which uses one program, whose program map packet ID is "300" that has a program number "3". For example, the elementary stream (ES) corresponding to the program whose program number is "1" is "Video 1 (video stream 1)", "Audio 1 (audio stream 1)", and "Audio 2 (audio stream 2)". Their elementary stream packet IDs (ES_PID) are "101", "102", and "103", respectively (refer to FIG. 6). The other contents of the elementary stream (ES) and the packet ID (ES_PID) are as shown in FIG. 23.

In this specific example as shown in FIG. 24, the TS #1 object is constructed such that one PAT can specify three PMTs and that each PMT can specify each TS packet of the elementary stream to be reproduced, with respect to the PAT and the PMT at the time of broadcasting.

More specifically, the packet ID (PID) of the PAT is set to a defined value such as "000", and because of this, it is possible to firstly specify or determine the PAT from among many packets (refer to FIG. 6) multiplexed each time point. Moreover, referring to the contents of the specified PAT, it is possible to specify the PMTs from among many packets (refer to FIG. 6) multiplexed each time point by use of the packet ID of the PMT for the "Program 1" (e.g. "100"), the packet ID of the PMT for the "Program 2" (e.g. "200"), or the packet ID of the PMT for the "Program 3" (e.g. "300").

Moreover, referring to the contents of the PMT as specified above can specify the TS packet whose content to be reproduced is packetized, from among many packets multiplexed each time point (refer to FIG. 6). For example, in the case where the PMT for the "program 1" is specified, it is possible to specify the TS packet by use of the packet ID of the TS packet for the "video stream 1" (e.g. "101"), the packet ID of the TS packet for the "audio stream 1" (e.g. "102"), or the packet ID of the TS packet for the "audio stream 2" (e.g. "103"). Moreover, as is the case where the PMT for the "program 2" and the PMT for the "program 3" are specified, the TS packet to be reproduced can be specified.

Especially, in this specific example, a group of data constituting a series of transport streams used for broadcasting (e.g. a sequentially broadcasted unit without CM (commercial) and the like) is treated as the "TS object" (refer to FIG. 3). Here, it is assumed that, firstly at the time of broadcasting, two shows are transmitted by using the TS #1 object as three programs, the "show 2" ends as time elapses, and after a commercial, the "show 1" is broadcasted by using the TS #2 object.

Furthermore, in this specific example as shown in FIG. 25, the TS #2 object is constructed such that two PMTs can be specified by one PAT and that each TS packet of the elementary stream to be reproduced can be specified by each PMT, with respect to the PAT and the PMT at the time of broadcasting.

As shown in FIG. 23 to FIG. 25, in this specific example, one title #1 is constituted by the TS #1 object and the TS #2 object as they are at the time of broadcasting, in which the CM contents are omitted.

Moreover, as shown in FIG. 26, the title #2 is constructed by using the TS #3 object in this specific example. The authoring operation is applied onto this TS object #3 so as to preliminarily store the TS object #3 as ROM contents. The TS object #3 is provided with the elementary streams for the video data and for the audio data, and especially, two elementary streams for the sub picture data (i.e. "Sub picture 1" and "Sub picture 2" as the contents of the ES in FIG. 26).

In this specific example, as shown in FIG. 27, the TS #3 object constituting the title 2 has the simply constructed PAT and PMT.

FIG. 28 shows the summary of the data structure constructed on the optical disc 100, which has been explained with reference to FIG. 23 to FIG. 27.

Namely, in FIG. 28, the data structure where the two titles are composed of three TS objects is constructed on the optical disc 100. Especially, the "show 1", which is binary-broadcasted, is logically reconstructed on the optical disc 100 as the title of a "multi vision" type (i.e. the type with which a user can freely change to watch) similar to the "angle change" of the DVD. In this change, this title does not use the audio stream "Audio 1" of the TS #1 object or the audio stream "Audio 6" of the TS #2 object, and further it does not use the elementary stream of the "show 2".

(Each Information File Structure)

Next, with reference to FIG. 29 to FIG. 32, various information files constructed on the optical disc 100 in the embodiment, i.e. the data structures of (1) the disc information file 110, (2) the play list information file 120, and (3) the object information file 130, which have been explained with reference to FIG. 3, will be explained using their own specific examples.

(1) Disc Information File:

Firstly, with reference to FIG. 29 and FIG. 30, the disc information file 110 will be explained in detail using one specific example. FIG. 29 schematically shows one specific example of the data structure of the disc information file 110. FIG. 30 schematically shows one specific example of the data structure of the title information table 114 included in the disc information file 110.

In this specific example as shown in FIG. 29, the disc information file 110 stores therein the disc comprehensive information 112, the title information table 114, and the other information 118.

Among them, the disc comprehensive information 112 is comprehensive information, such as disc volume information indicating the serial number of one series constructed by a plurality of optical discs 100, total title number information and so on.

The title information table 114 stores therein the entire play lists constituting each title and the other information, e.g. information for each title, such as chapter information within the title and the like, and includes title pointer information, title #1 information, title #2 information, and so on. Here, the "title pointer information" is the storing address information of the title #n information, i.e. the storing address information indicating the storing position of the title #n information in the title information table 114, as the correspondence relationship is indicated with arrows in FIG. 29, and the "title pointer information" is written with a relative logical address. Then, this information of the number of titles in the optical disc 100 is arranged in the order of the titles as the relative logical address. Incidentally, the data amount of each storing address information may be a fixed byte or a changeable byte.

The other information 118 is information about each title, such as the title type, for example, the sequential type, the branch type, and the like, which have been already explained with reference to FIG. 8, and the total number of play lists.

Incidentally, in the specific example shown in FIG. 23 to FIG. 28, the both titles are individually constructed of simply one play list. Therefore, in the case of this specific example, the title information table 114 stored in the disc information file 110 shown in FIG. 29 is written as a table having relatively simple contents as shown in FIG. 30.

(2) Play List Information File:

Next, with reference to FIG. 31, the play list information file 120 will be explained in detail using one specific example. FIG. 31 schematically shows one specific example of the data structure on the play list information table 121 constructed in the play list information file 120.

In this specific example, as shown in FIG. 31, the play list information file 120 stores therein play list comprehensive information 122, a play list pointer table 124, and a play list #1 information table and a play list #2 information table 126, for each Field type, as the play list information table 121 (refer to FIG. 3).

Each Field may have a structure that allows the necessary number of each table to be added. For example, if there are four play lists, the relative Field may increase to four Fields under this structure, and so does the Item information table.

Among them, the play list comprehensive information (P list comprehensive information) 122 describes therein the size of the play list table, the total number of play lists, and the like.

The play list pointer table (P list pointer table) 124 stores therein the address of each play list written position as being the relative logical address in the play list information table 126, as the correspondence relationship is indicated with arrows in FIG. 31.

The play list #1 information table (P list #1 information table) 126 stores therein comprehensive information about the play list #1, the Item information table of the play list #1 (P list Item information table) and the other information. The play list #2 information table 126 also stores therein the same type of information related to the play list #2.

The "Item information table" stores therein the Item information of the total number of Items constituting one program list. Here, an AU number in the AU (Associate Unit) table written in the "Item #1 (Item #1 information)" or the "Item #2 (Item #2 information)" is the number of the AU, which stores information for specifying the address of the TS object to be used for the Item reproduction, or specifying each elementary stream (i.e. the video stream, the audio stream, or the sub picture stream) in the TS object to be used for the Item reproduction.

(3) Object Information File:

Next, with reference to FIG. 32, the object information file 130 will be explained in detail using one specific example. FIG. 32 schematically shows one specific example of the data structures on the AU table 131 (refer to FIG. 3) constructed in the object information file 130 and on the ES map table 134 (refer to FIG. 3) related to the AU table 131.

In this specific example, as shown in FIG. 32, the object information file 130 stores therein object information tables. The object information tables comprise the AU table 131 shown in the upper part of FIG. 32 and the ES map table 134 shown in the lower part.

In the upper part of FIG. 32, the AU table 131 may have a structure that allow the necessary number of tables for each Field to be added. For example, if there are four AUs, the relative Field may increase to four Fields under this structure.

The AU table 131 stores therein "AU table comprehensive information" in which the number of AUs and the pointer to each AU, and the like are written, and "the other information."

The AU table 131 describes therein the Index number (Index number=...) of the corresponding ES map table 134, as the AU information 132I indicating an ES table Index #m in each PU #m corresponding to each AU #n. Here, the "AU" is a unit corresponding to a "show" in TV broadcast, for example, as mentioned above (especially, in the case of "multi-vision" broadcasting, it is a unit of a group of a plurality of "visions" which are changeable or selectable), and it includes one or more PUs, each of which is a reproduction unit. Moreover, the "PU" is a group of mutually changeable elementary streams which are included in each AU, as described above, and the ES table Index #m corresponding to each PU is specified by the PU information 302I. For example, in the case of constructing multi-view contents with the AU, the AU stores therein a plurality of PUs, and each PU stores therein the pointers to a plurality of elementary stream packet IDs, which indicate the packets constituting the content of each view. This indicates the Index number in the ES map table 134, as described later.

Particularly in the embodiment, the discontinuity information 131C (refer to FIG. 12) for indicating a discontinuous condition of the packet number described above is given to the AU table 131. As described above, the discontinuity information 131C is commonly unified and written with respect to the plurality of AUs, which is extremely excellent from the viewpoint of saving the recording capacity.

In the lower part of FIG. 32, the ES map table 134 stores therein ES map table comprehensive information, a plurality of Indexes #m (m=1, 2, ... ), and the "other information", for each Field.

The "ES map table comprehensive information" describes therein the size of the ES map table, the total number of Indexes, and the like.

The "Index #m" includes the elementary stream packet IDs (ES_PIDs) of the entire elementary streams to be used for the reproduction, the corresponding Index numbers, and the address information of the elementary stream.

Particularly in the embodiment, the packet number (SPN) and the corresponding display start time point are written as the address information, i.e. the ES address information 134a (refer to FIG. 10). If the elementary stream is the video stream of the MPEG 2 as described above, only the address of the TS packet at the head of the I picture is written as the ES address information 134a on the ES map table 134, by which the data amount is tried to be reduced.

Because of the construction as described above, it is possible to obtain the elementary stream packet ID (ES_PID) of the actual elementary stream from the Index number of the ES map 134 specified from the AU table 131. Moreover, since the address information of the elementary stream corresponding to the elementary stream packet ID can be obtained at the same time, it is possible to reproduce the object data on the basis of these information.

According to the data structure of the optical disc 100 explained above, even in the case of adding a new title to the optical disc 100, necessary information can be added easily, which is useful. On the other hand, even if some information becomes unnecessary as a result of editing or the like, for example, what is to be done is simply not to refer to the information, and it is not necessary to actually delete the information from the table, which is useful, as well.

Incidentally, in FIG. 32, even the ES_PID that is not referred to from the AU table 131 in the upper part is described by the Index of the ES map table 134 in the lower part; however, it is not necessary to describe the ES_PID that is not referred to, in this manner. If the more versatile ES map table 134 is prepared in advance by describing the ES_PID that is not referred to in this manner, it is not necessary to reconstruct the ES map table in the case of reediting the content, such as trying the authoring operation again, which is advantageous.

As explained in detail with reference to FIG. 1 to FIG. 32, according to the embodiment, even if the TS objects 142 are prepared on the basis of different PAT and PMT construction rules, as is a local rule that differs from country to country, and even if the entity data of the TS objects 142 is stored on the optical disc 100 as it is, without changing the structures of the TS objects 142, it is possible to reproduce the information by using the AU information 132I and the PU information 302I, without any problem.

Particularly in the embodiment, the address specification, which uses the ES address information 134a written on the ES map table 134, enables the efficient access operation upon reproduction. Moreover, even if such a condition that the TS packet or packets are lacked as compared with the beginning of recording is generated by the editing, i.e. even if the packet number given at the beginning of recording becomes discontinuous, the subsequent address specification is performed by additionally recording the discontinuity information 131C according to the editing content and using this as well as the ES address information 134a. Therefore, even in such editing, it is unnecessary to rewrite the ES address information 134a or the ES map table 134, which is extremely advantageous.

Incidentally, the optical disc 100 as one example of the information recording medium and a recorder or a player related to the optical disc 100 as one example of the information recording/reproducing apparatus are explained in the above described embodiment; however, the present invention is not limited to the optical disc, and the recorder or the player. The present invention is available for the other various information recording/reproducing media corresponding to the high density recording or the high transmission rate, and their recorders or players.

According to this embodiment, as described above in detail, it is possible to multiplex and record a large amount of content information, such as a plurality of shows or programs, which is transmitted in the transport stream or the like, and relatively simply reproduce a desired one from among them. At the same time, it is possible to efficiently edit the content information.

The present invention is not limited to the above-described embodiments, and changes may be made if desired without departing from the scope or spirit of the invention which can be read from the claims and the entire specification. An information recording medium, an apparatus for and a method of recording the information, an apparatus for and a method of reproducing the information, an apparatus for and a method of recording and reproducing the information, a computer program for controlling the record or the reproduction, and a data structure including a control signal that accompany such changes are also intended to be within the technical scope of the present invention.

INDUSTRIAL APPLICABILITY

An information recording medium, a apparatus for and a method of recording the information, an apparatus for and a method of reproducing the information, an apparatus for and a method of recording and reproducing the information, a computer program for controlling the record or the reproduction, and a data structure including a control signal that are associated with the present invention can be applied to a high-density optical disc for consumer or industrial use, such as a DVD, on which various information, such as the video information, the audio information, the sub picture information, and the reproduction control information, can be recorded at high density and further can be applied to a DVD player, a DVD recorder, and the like. Moreover, they can be applied to an information recording medium, an information recording/reproducing apparatus, or the like, which are inserted in or can be connected to various computer equipment for consumer or industrial use, for example.

The invention claimed is:

1. A computer readable storage medium on which content information constructing a series of contents is multiplexed-and-recorded by a unit of packet, which is a physically accessible unit, comprising:
   an object data file, which is a logically accessible unit, for storing object data which comprises a plurality of packets, each storing therein a piece of the content information;
   a reproduction sequence information file for storing reproduction sequence information which defines a reproduction sequence of the object data stored in said object data file; and
   an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number.

2. The computer readable storage medium according to claim 1, wherein the discontinuity information includes: point information for indicating a point at which the discontinuous condition is generated; and offset information for indicating the number of the packet lacked at the point.

3. The computer readable storage medium according to claim 1, wherein
   the object data is constructed by multiplexing an entire stream including a plurality of portion streams, each of which comprises a series of the content information, by the unit of packet, and
   said object information file stores, as another reproduction control information for controlling the reproduction of said object data file, correspondence definition information which defines a correspondence relationship between the plurality of packets which are multiplexed and the plurality of portion streams.

4. The computer readable storage medium according to claim 3, wherein the correspondence definition information has address information, which includes at least one portion of the serial number associated with the packets constructing each portion stream and a display start time point corresponding thereto, for each of the plurality of portion streams.

5. The computer readable storage medium according to claim 4, wherein if the content information is video information based on a MPEG 2 (Moving Picture Experts Group phase 2) standard, the address information includes the serial number of the packets associated with an i picture and a display start time point corresponding thereto.

6. The computer readable storage medium according to claim 3, wherein the correspondence definition information further has table information for indicating a packet identification number which is given uniquely between the plurality of packets multiplexed at the same time point, for each of the portion streams.

7. An information recording apparatus for multiplexing and recording content information constructing a series of contents onto an information recording medium by a unit of packet, which is a physically accessible unit,
   said information recording apparatus comprising:
   a first recording device for recording an object data file, which is a logically accessible unit, for storing object data which comprises a plurality of packets, each storing therein a piece of the content information;
   a second recording device for recording a reproduction sequence information file for storing reproduction sequence information which defines a reproduction sequence of the object data stored in said object data file; and
   a third recording device for recording an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number.

8. An information recording method of multiplexing and recording content information constructing a series of contents onto an information recording medium by a unit of packet, which is a physically accessible unit,
   said information recording method comprising:
   a first recording process of recording an object data file, which is a logically accessible unit, for storing object data which comprises a plurality of packets, each storing therein a piece of the content information;
   a second recording process of recording a reproduction sequence information file for storing reproduction sequence information which defines a reproduction sequence of the object data stored in said object data file; and
   a third recording process of recording an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number.

9. An information reproducing apparatus for reproducing recorded content information from an information recording medium on which the content information constructing a series of contents is multiplexed-and-recorded by a unit of packet, which is a physically accessible unit, comprising: an object data file, which is a logically accessible unit, for storing object data which comprises a plurality of packets, each storing therein a piece of the content information; a reproduction sequence information file for storing reproduction sequence information which defines a reproduction sequence of the object data stored in said object data file; and an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number, said information reproducing apparatus comprising:
a reading device for physically reading information from said information recording medium; and
a reproducing device for reproducing the object data included in the information read by said reading device on the basis of the reproduction control information and the reproduction sequence information included in the information read by said reading device.

10. The information reproducing apparatus according to claim 9, wherein upon accessing arbitrary packet, said reproducing device accesses the arbitrary packet by specifying an address of the arbitrary packet on the basis of the discontinuity information.

11. The information reproducing apparatus according to claim 9, wherein said reproducing device specifies an address of an arbitrary packet on the basis of the discontinuity information and maintains it in a memory in advance, and accesses the arbitrary packet on the basis of the address maintained in the memory.

12. An information reproducing method of reproducing recorded content information from an information recording medium on which the content information constructing a series of contents is multiplexed-and-recorded by a unit of packet, which is a physically accessible unit, comprising: an object data file, which is a logically accessible unit, for storing object data which comprises a plurality of packets, each storing therein a piece of the content information; a reproduction sequence information file for storing reproduction sequence information which defines a reproduction sequence of the object data stored in said object data file; and an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number, said information reproducing method comprising:
a reading process of physically reading information from said information recording medium; and
a reproducing process of reproducing the object data included in the information read by said reading process on the basis of the reproduction control information and the reproduction sequence information included in the information read by said reading process.

13. An information recording and reproducing apparatus for recording content information onto and reproducing the recorded content information from an information recording medium on which the content information constructing a series of contents is multiplexed-and-recorded by a unit of packet, which is a physically accessible unit, comprising: an object data file, which is a logically accessible unit, for storing object data which comprises a plurality of packets, each storing therein a piece of the content information; a reproduction sequence information file for storing reproduction sequence information which defines a reproduction sequence of the object data stored in said object data file; and an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number, said information recording and reproducing apparatus comprising:
a first recording device for recording the object data file;
a second recording device for recording the reproduction sequence information file;
a third recording device for recording the object information file;
a reading device for physically reading information from said information recording medium; and
a reproducing device for reproducing the object data included in the information read by said reading device on the basis of the reproduction control information and the reproduction sequence information included in the information read by said reading device.

14. The information recording and reproducing apparatus according to claim 13, wherein upon accessing arbitrary packet, said reproducing device accesses the arbitrary packet by specifying an address of the arbitrary packet on the basis of the discontinuity information.

15. The information recording and reproducing apparatus according to claim 13, wherein said reproducing device specifies an address of an arbitrary packet on the basis of the discontinuity information and maintains it in a memory in advance, and accesses the arbitrary packet on the basis of the address maintained in the memory.

16. The information recording and reproducing apparatus according to claim 13, further comprising: an editing device for controlling said third recording device to additionally record the discontinuity information if the lack of the packet is generated upon editing.

17. An information recording and reproducing method of recording content information onto and reproducing the recorded content information from an information recording medium on which the content information constructing a series of contents is multiplexed-and-recorded by a unit of packet, which is a physically accessible unit, comprising: an object data file, which is a logically accessible unit, for storing object data which comprises a plurality of packets, each storing therein a piece of the content information; a reproduction sequence information file for storing reproduction sequence information which defines a reproduction sequence of the object data stored in said object data file; and an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number, said information recording and reproducing method comprising:
a first recording process of recording the object data file;
a second recording process of recording the reproduction sequence information file;
a third recording process of recording the object information file;
a reading process of physically reading information from said information recording medium; and a reproducing process of reproducing the object data included in the information read by said reading process on the basis of the reproduction control information and the reproduction sequence information included in the information read by said reading process.

18. A computer program recorded on a computer readable storage medium for controlling record and for tangibly embodying a program of instructions executable by a computer to make the computer function as at least one portion of a first recording device, a second recording device, and a third recording device, the computer being provided in an information recording apparatus for multiplexing and recording content information constructing a series of contents onto an information recording medium by a unit of packet, which is a physically accessible unit, said information recording apparatus comprising:

said first recording device for recording an object data file, which is a logically accessible unit, for storing object data which comprises a plurality of packets, each storing therein a piece of the content information;

said second recording device for recording a reproduction sequence information file for storing reproduction sequence information which defines a reproduction sequence of the object data stored in said object data file; and said third recording device for recording an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number.

19. A computer program recorded on a computer readable storage medium for controlling reproduction and for tangibly embodying a program of instructions executable by a computer to make the computer function as at least one portion of a reproducing device, the computer being provided in an information reproducing apparatus for reproducing recorded content information from an information recording medium on which the content information constructing a series of contents is multiplexed-and-recorded by a unit of packet, which is a physically accessible unit, comprising: an object data file, which is a logically accessible unit, for storing object data which comprises a plurality of packets, each storing therein a piece of the content information; a reproduction sequence information file for storing reproduction sequence information which defines a reproduction sequence of the object data stored in said object data file; and an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number, said information reproducing apparatus comprising:

a reading device for physically reading information from said information recording medium; and said reproducing device for reproducing the object data included in the information read by said reading device on the basis of the reproduction control information and the reproduction sequence information included in the information read by said reading device.

20. A computer program recorded on a computer readable storage medium for controlling record and reproduction and for tangibly embodying a program of instructions executable by a computer to make the computer function as at least one portion of a first recording device, a second recording device, a third recording device, and a reproducing device, the computer being provided in an information recording and reproducing apparatus for recording content information onto and reproducing the recorded content information from an information recording medium on which the content information constructing a series of contents is multiplexed-and-recorded by a unit of packet, which is a physically accessible unit, comprising: an object data file, which is a logically accessible unit, for storing object data which comprises a plurality of packets, each storing therein a piece of the content information; a reproduction sequence information file for storing reproduction sequence information which defines a reproduction sequence of the object data stored in said object data file; and an object information file for storing, as reproduction control information for controlling reproduction of said object data file, discontinuity information for indicating a discontinuous condition of a serial number of the plurality of packets corresponding to a recording order upon multiplexing-and-recording, the discontinuous condition being generated by a lack of the packet upon editing after the multiplexing-and-recording, with respect to the serial number, said information recording and reproducing apparatus comprising:

said first recording device for recording the object data file;

said second recording device for recording the reproduction sequence information file;

said third recording device for recording the object information file;

a reading device for physically reading information from said information recording medium; and said reproducing device for reproducing the object data included in the information read by said reading device on the basis of the reproduction control information and the reproduction sequence information included in the information read by said reading device.

* * * * *